US009473848B2

(12) United States Patent
Chick et al.

(10) Patent No.: US 9,473,848 B2

(45) Date of Patent: Oct. 18, 2016

(54) TRANSMISSION LINE LOUDSPEAKER

(71) Applicant: Bose Corporation, Framingham, MA (US)

(72) Inventors: Geoffrey C. Chick, Norfolk, MA (US); Carl Jensen, Waltham, MA (US); Brian M. Lucas, Marlblehead, MA (US)

(73) Assignee: Bose Corporation, Framingham, MA (US)

( * ) Notice: Subject to any disclaimer, the term of this patent is extended or adjusted under 35 U.S.C. 154(b) by 63 days.

(21) Appl. No.: 14/290,050

(22) Filed: May 29, 2014

(65) Prior Publication Data

US 2015/0071474 A1 Mar. 12, 2015

Related U.S. Application Data

(63) Continuation-in-part of application No. 14/022,600, filed on Sep. 10, 2013, now Pat. No. 9,049,517.

(51) Int. Cl.

*H04R 1/02* (2006.01)
*H04R 9/06* (2006.01)
*H04R 1/28* (2006.01)

(Continued)

(52) U.S. Cl.

CPC .............. *H04R 1/2857* (2013.01); *H04R 1/20* (2013.01); *H04R 1/28* (2013.01); *H04R 1/2853* (2013.01); *H04R 1/40* (2013.01); *H04R 1/2807* (2013.01); *H04R 1/2861* (2013.01); *H04R 1/30* (2013.01); *H04R 1/345* (2013.01)

(58) Field of Classification Search

CPC ........ H04R 1/28; H04R 1/2807; H04R 1/30; H04R 1/2861; H04R 1/345; H04R 1/2853; H04R 1/20; G10K 11/16; G10K 11/168; G10K 15/04; G10K 15/043; F16F 9/306; B25D 17/11; F01N 13/08; G01S 1/72

USPC .................. 381/337, 388, 340; 181/142, 207

See application file for complete search history.

(56) References Cited

U.S. PATENT DOCUMENTS 4,570,745 A * 2/1986 Sparks .................... F16L 55/04 138/26

5,025,885 A 6/1991 Froeschle (Continued)

FOREIGN PATENT DOCUMENTS

EP 1994793 A2 11/2008

WO 2010136639 A1 12/2010

OTHER PUBLICATIONS

Canini, Sergio, "Il Transflex", www.caninialtoparlanti.it, Jul. 16, 2003, accessed Feb. 12, 2015, translation by Google Translate; 10 pages.

(Continued)

*Primary Examiner* — Duc Nguyen

*Assistant Examiner* — Sean H Nguyen

(74) *Attorney, Agent, or Firm* — Schmeiser, Olsen & Watts LLP

(57) ABSTRACT

An electro-acoustic driver including an acoustic waveguide includes an enclosure, an acoustic transmission line formed within the enclosure, and a plurality of acoustic transducers contained within the enclosure and disposed along a length of the acoustic transmission line. Each acoustic transducer is configured to emit acoustic energy directly into the acoustic transmission line at two separated locations along the length of the acoustic transmission line.

20 Claims, 20 Drawing Sheets

(51) Int. Cl.

| | |
|---|---|
| ***H04R 1/40*** | (2006.01) |
| ***H04R 1/20*** | (2006.01) |
| *H04R 1/34* | (2006.01) |
| *H04R 1/30* | (2006.01) |

(56) References Cited

U.S. PATENT DOCUMENTS

| | | | |
|---|---|---|---|
| 5,092,424 | A | 3/1992 | Schreiber et al. |
| 5,590,208 | A | 12/1996 | Koyano et al. |
| 5,659,157 | A | 8/1997 | Shulte |
| 6,700,984 | B1 * | 3/2004 | Holberg ............... H04R 1/2857 181/199 |
| 7,454,030 | B2 | 11/2008 | Graber |
| 7,886,869 | B2 | 2/2011 | Bastyr et al. |
| 8,457,341 | B2 | 6/2013 | Danley |
| 2005/0111673 | A1 | 5/2005 | Rosen et al. |
| 2011/0037906 | A1 * | 2/2011 | Gawronski .............. H04N 5/60 348/738 |

OTHER PUBLICATIONS

Anonymous, “Speakerplan.com Forum Topic: Horn Sub Junior”, www.speakerplans.com, Apr. 2007, accessed Feb. 12, 2015; 6 pages.

International Search Report & Written Opinion in related international patent application No. PCT/US14/54044, mailed on Nov. 20, 2014; 12 pages.

* cited by examiner

TRANSMISSION LINE LOUDSPEAKER

RELATED APPLICATIONS

This application is a continuation-in-part (CIP) of U.S. patent application Ser. No. 14/022,600, filed on Sep. 10, 2013, the entirety of which is incorporated by reference herein.

BACKGROUND

This invention relates to an acoustic transmission line loudspeaker.

Many conventional loudspeakers utilize waveguides to guide sound pressure waves along a convoluted path within their enclosures. Depending on the characteristics of a given waveguide, a certain portion of the energy present in the sound pressure waves is absorbed while traveling through the waveguide and another portion of the energy passes through the waveguide and is radiated as sound into an external environment. It is often the case that the waveguide is configured such that sound radiated from the waveguide enhances the low frequency output of the loudspeaker.

Some complex conventional loudspeakers include a number of volumes, at least some of which are connected by ports and/or passive radiators. Such loudspeakers include an acoustic transducer which radiates directly into one or two of the volumes. The sound radiated from the transducer propagates through the volumes, through the ports and/or passive radiators, and is eventually radiated into an external environment. The number and size of volumes along with the number, size, and placement of the ports and/or passive radiators are chosen to achieve a desired characteristic in the sound radiated into the external environment.

SUMMARY

In a general aspect, a loudspeaker including an acoustic waveguide includes an enclosure, an acoustic transmission line formed within the enclosure, and a plurality of acoustic transducers contained within the enclosure and disposed along a length of the acoustic transmission line, each acoustic transducer configured to emit acoustic energy directly into the acoustic transmission line at two separated locations along the length of the acoustic transmission line.

Aspects may include one or more of the following features.

The acoustic transmission line may be a folded acoustic transmission line, the enclosure may include an internal wall with each side of the internal wall forming at least some of a boundary of the folded acoustic transmission line, and the plurality of acoustic transducers may be disposed along the internal wall. The internal wall may be corrugated. The internal wall may include a plurality of ridges separated by a plurality of grooves, at least some of the plurality of grooves having one or more of the plurality of acoustic transducers disposed therein.

Each acoustic transducer may be configured to emit a first acoustic energy from a first location of the two separated locations along the length of the acoustic transmission line and to emit a second, complementary acoustic energy from a second location of the two separated locations along the length of the acoustic transmission line. The acoustic transmission line may have a closed end and an open end, the acoustic transmission line tapering from the open end to the closed end. The closed end of the acoustic transmission line may taper to a point.

A cross-sectional diameter of the transmission line at its open end may be greater than a cross-sectional diameter of the transmission line at its closed end. Each acoustic transducer may be a speaker driver. Each speaker driver may include a diaphragm having a front side and a back side, both sides configured to emit acoustic energy into the acoustic transmission line. The enclosure, the acoustic transmission line, and the plurality of acoustic transducers may be configured to generate an acoustic output having a band-pass characteristic. The enclosure, the acoustic transmission line, and the plurality of acoustic transducers may be configured to have two or more impedance minima.

The enclosure, the acoustic transmission line, and the plurality of acoustic transducers are configured to have two or more motion nulls at frequencies in a pass-band of the acoustic output.

Embodiments may include one or more of the following advantages:

Among other advantages, the acoustic transmission line of the loudspeaker reduces high frequency harmonic peaks when compared to conventional loudspeakers due to the closed end of the acoustic transmission line terminating in a point.

The loudspeaker has acoustic transducers mounted on the internal wall such that both sides of the acoustic transducers emit energy into the acoustic transmission line. This reduces high frequency output and improves low frequency output when compared to conventional loudspeakers with acoustic transducers mounted on an external wall.

The loudspeaker has a single outlet and therefore requires no grilles allowing for the placement of objects onto the loudspeaker.

The acoustic transmission line has an inverted taper causing the outlet into the outside environment to be large, resulting in a decrease in the velocity of air leaving the loudspeaker as compared to conventional loudspeakers.

Due to the modifiable shape of the internal wall, the loudspeaker can be configured into a number of different application-specific form factors.

In other aspect, an acoustic waveguide system may comprise an enclosure having a closed end and an open end; an acoustic transmission line within the enclosure; and at least one electro-acoustic transducer disposed along a length of the acoustic transmission line to emit acoustic energy directly into the acoustic transmission line, and constructed and arranged to prohibit exciting at least one resonant mode above a fundamental resonant mode of the acoustic waveguide system.

Aspects may include one or more of the following features.

The at least one electro-acoustic transducer has a front side and a rear side. The acoustic energy output from the front side and the rear side may be out of phase, such that the at least one electro-acoustic transducer prohibits exciting the at least one resonant mode.

The acoustic transmission line may be a folded acoustic transmission line. The enclosure comprises an internal wall with each side of the internal wall forming at least some of a boundary of the folded acoustic transmission line. The at least one electro-acoustic transducer may be disposed along the internal wall.

The at least one electro-acoustic transducer may be coupled to the internal wall such that a front side and a rear side of the electro-acoustic transducer are symmetric about a point along the length of the acoustic transmission line.

The at least one electro-acoustic transducer may prohibit exciting the first resonant mode above the fundamental resonant mode of the acoustic waveguide system.

The point along the length of the acoustic transmission line may be at approximately one third of the length of the acoustic transmission line, measured from the open end of the enclosure.

The at least one electro-acoustic transducer may prohibit exciting the second resonant mode above the fundamental resonant mode of the acoustic waveguide system.

The at least one electro-acoustic transducer may be coupled to an internal wall of the enclosure such that a front side and a rear side of the electro-acoustic transducer are symmetric about a point on the acoustic transmission line. The point may be at approximately one fifth of the length of the acoustic transmission line, measured from the open end of the enclosure.

The at least one electro-acoustic transducer may comprise a plurality of electro-acoustic transducers, and wherein none of the electro-acoustic transducers excite the at least one resonant mode above the fundamental resonant mode.

The acoustic transmission line comprises at least two folds. The at least one electro-acoustic transducer may be arranged at a fold of the at least two folds nearest the open end of the acoustic transmission line.

The acoustic waveguide system may comprise a tapered acoustic transmission line that tapers from the closed end to the open end, and further comprises internal and external walls having a curved geometry.

The internal wall may comprise a fold of the waveguide system such that the internal wall includes locations along the internal wall such that distances on one side of the internal wall versus the other side of the internal wall maintains a match in pressure amplitude according to a mode function.

In other aspect, an acoustic waveguide system may comprise an enclosure having a closed end, an open end, and an internal wall; an acoustic transmission line within the enclosure; and at least one electro-acoustic transducer disposed along a length of the acoustic transmission line to emit acoustic energy directly into the acoustic transmission line. The at least one electro-acoustic transducer may be coupled to the internal wall such that a front side and a rear side of the electro-acoustic transducer are symmetric about a point along the length of the acoustic transmission line where the at least one electro-acoustic transducer prohibits exciting at least one resonant mode above a fundamental resonant mode of the acoustic waveguide system.

Aspects may include one or more of the following features.

The acoustic transmission line may be a folded acoustic transmission line.

The point along the length of the acoustic transmission line may be at approximately one third of the length of the acoustic transmission line, measured from the open end of the enclosure.

The at least one electro-acoustic transducer prohibits may excite a second resonant mode above the fundamental resonant mode of the acoustic waveguide system.

The at least one electro-acoustic transducer may be coupled to an internal wall of the enclosure such that a front side and a rear side of the electro-acoustic transducer are symmetric about a point along the length of the acoustic transmission line. The point may be at approximately one fifth of the length of the acoustic transmission line, measured from the open end of the enclosure.

The acoustic transmission line comprises at least two folds. The at least one electro-acoustic transducer may be arranged at a fold of the at least two folds nearest the open end of the acoustic transmission line.

The acoustic waveguide system may comprise a tapered acoustic transmission line that tapers from the closed end to the open end, and further comprises internal and external walls having a curved geometry.

In another aspect, an acoustic waveguide system may comprise an enclosure having a closed end and an open end; a tapered acoustic transmission line within the enclosure, the tapered acoustic transmission line comprising internal and external walls, each having a curved geometry; and at least one electro-acoustic transducer disposed along a length of the acoustic transmission line to emit acoustic energy directly into the acoustic transmission line. The at least one electro-acoustic transducer may be positioned along the acoustic transmission line in the enclosure to drive at least one resonant mode above the fundamental resonant mode at a same amplitude and phase on a front side and a back side of the at least one electro-acoustic transducer.

The curved geometry may comprise locations along which a distance on one side of the waveguide system versus the other side of the waveguide system maintains a match in pressure amplitude according to a mode function.

Other features and advantages of the invention are apparent from the following description, and from the claims.

DESCRIPTION

Figure 1:
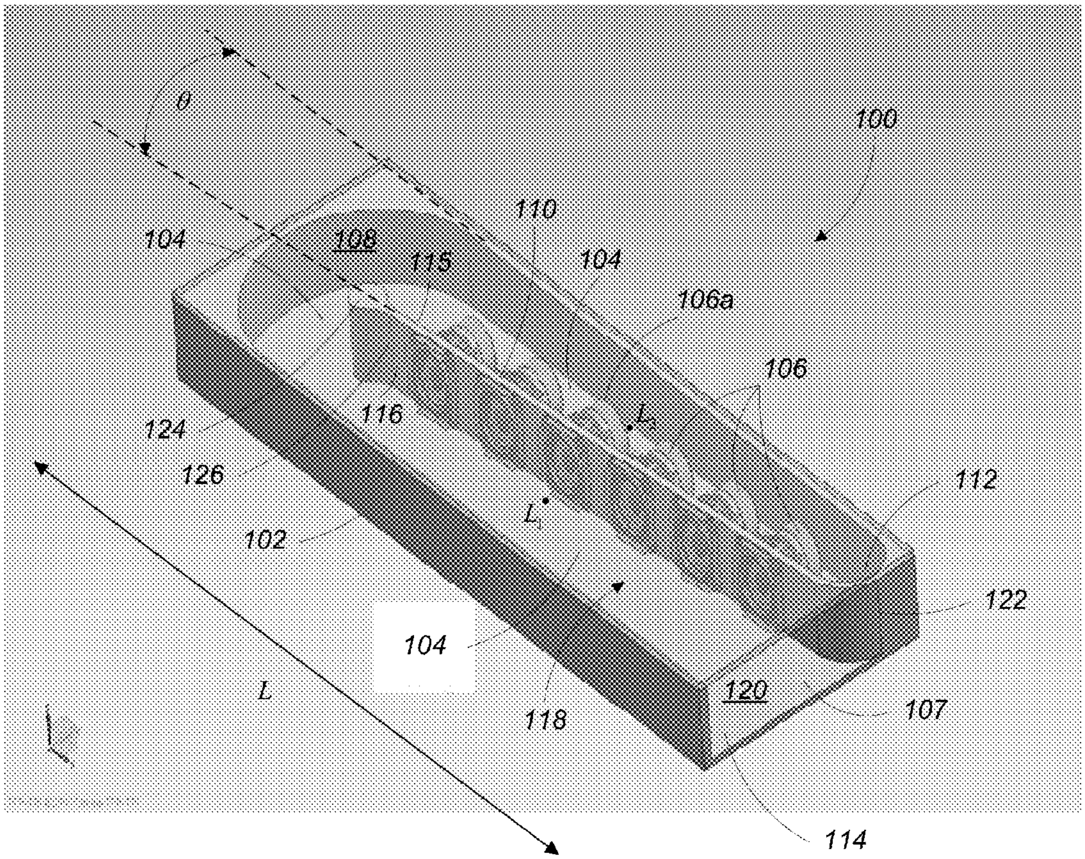
FIG. 1 is a first embodiment of a loudspeaker including an acoustic transmission line.

Referring to FIG. 1, a loudspeaker 100 includes a substantially hollow enclosure 102 including an internal wall 110 and a number of acoustic transducers 106 (i.e., drivers) disposed within the enclosure 102.

1 Enclosure

In some examples, the enclosure 102 includes an opening 107 at a first end 122 of the enclosure 102, a substantially rounded u-shaped inner side surface 108, an inner top surface 118 (shown transparently for the purpose of providing visibility into the enclosure 102 of the loudspeaker 100), and an inner bottom surface 120. The internal wall 110 extends from the inner side surface 108 at a point near or at the first end 122 of the enclosure 102 and partially along a length, L, of the enclosure 102. The internal wall 110 also extends from the inner bottom surface 120 to the inner top surface 118 of the enclosure 102.

2 Acoustic Transmission Line

The inner surface 108 of the enclosure 102 together with the internal wall 110 forms a boundary of an acoustic transmission line 104. The term "acoustic transmission line," as used herein refers to a rigid walled, tubular structure through which sound pressure waves propagate without encountering impediments such as ported walls. In general, an "acoustic transmission line" is long and thin as compared to the wavelength of sound pressure waves present therein. In some examples, a fundamental tuning frequency of the acoustic transmission line is defined by the length of the acoustic transmission line. For example, the modes of a straight waveguide are given by:

$$f_n = \frac{2n-1}{4}\frac{c}{L},$$

where c is the speed of sound and L is the length of the waveguide. Normalizing the modes in terms of c/L gives the frequencies as 0.25, 0.75, 1.25, and so on.

Figure 2:
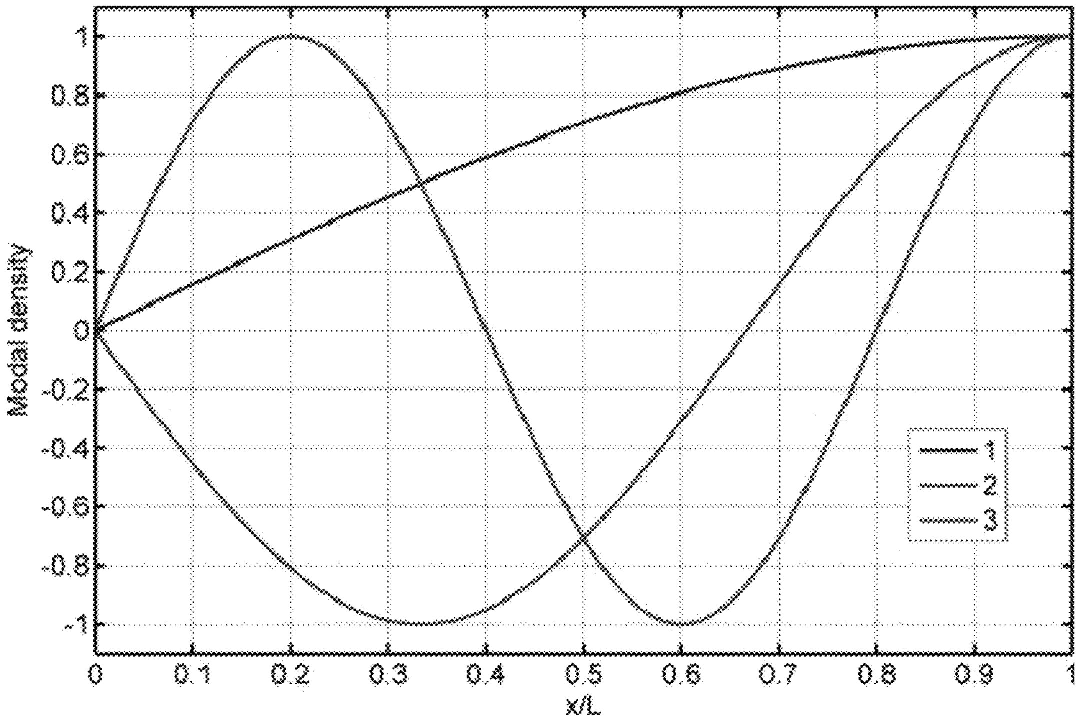
FIG. 2 is a graph of modal density for an acoustic transmission line.

Referring to FIG. 2, the first three modal distribution functions for a straight-walled waveguide of length L are illustrated with the open end on the left. For a waveguide with a length, L, of 2 meters, the frequencies of the modes are 42.4 Hz, 127.3 Hz, and 212.1 Hz.

In the loudspeaker 100 of FIG. 1, the acoustic transmission line 104 is folded in that a first side 115 of the internal wall 110 forms a first part of the boundary of the acoustic transmission line 104 and a second side 116 of the internal wall 110 forms a second, different part of the boundary of the acoustic transmission line 104. That is, the internal wall 110 serves as a shared boundary for at least some of the acoustic transmission line 104.

The acoustic transmission line 104 has a first end 112 which is closed to an outside environment 116 and a second end 114 which opens to the outside environment 116 through the opening 107 in the enclosure 102. In operation, acoustic energy present in the transmission line propagates from the first end 112 to the second end 114 and into the outside environment 116 through the opening 107.

Figure 3:
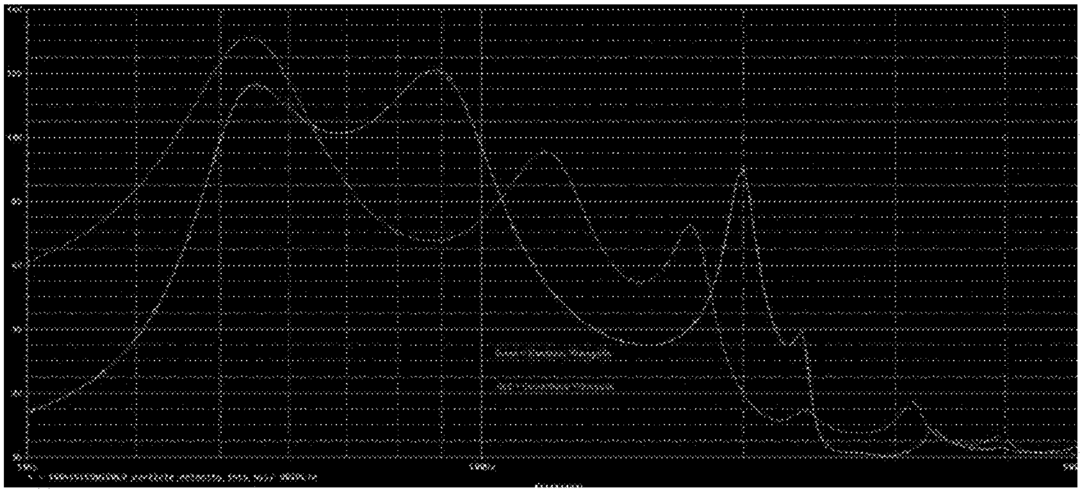
FIG. 3 is a graph of port velocity vs. frequency for a conventional and a band-pass acoustic transmission line.

In some examples, the internal wall 110 extends in a direction along the length, L, of the enclosure 102 at an angle, θ relative to the inner side surface 108. By extending at the angle, θ, the acoustic transmission line 104 is tapered such that a cross sectional area of the acoustic transmission line 104 at its first end 112 is smaller than a cross sectional area of the acoustic transmission line 104 at its second end 114. In some examples, this type of taper is referred to as an "inverted taper." In some examples, the taper of the acoustic transmission line 104 reduces a velocity and turbulence of the air exiting the acoustic transmission line 104 thereby reducing unwanted nose. In some examples it is desirable to maintain the velocity of air exiting the port at less than 15 m/s. Referring to FIG. 3, a plot of port velocity vs. frequency for a conventional waveguide (shown in green) and a band-pass waveguide (shown in red) illustrates a reduced port velocity for the band-pass waveguide at a number of frequencies.

In some examples, the angle, θ is adjusted to optimize the reduction in noise and to suppress the propagation of unwanted high frequency harmonic peaks. In some examples, the first end 112 of the acoustic transmission line 104 tapers to a point.

In some examples, a rounded (e.g., teardrop shaped) member 124 is disposed at a detached end 126 of the internal wall 110 for the purpose of facilitating the flow of air around the detached end 126 of the internal wall 110. In some examples, the rounded member 124 reduces turbulence in the air as the air propagates past the detached end 126 of the internal wall 110. In some examples a size of the teardrop shaped member 124 is made substantially large relative to the cross-section of the acoustic transmission line 104 in order to increase the path length of the acoustic transmission line 104, thereby reducing the tuning frequency of the acoustic transmission line 104.

In some examples, the output characteristic of the loudspeaker 100 can be varied by altering the physical characteristics of the acoustic transmission line 104. For example, a loudspeaker designer may vary the length of the acoustic transmission line 104, the angle, θ of taper of the acoustic transmission line 104, the total volume of the acoustic transmission line 104, the overall size of the enclosure 102, the size of the opening 107 in the enclosure 102, the length of the internal wall 110, and so on.

In some examples, acoustically absorbent material (e.g., foam) is placed in the acoustic transmission line 104 (e.g., at the closed end 112 of the acoustic transmission line 104) to attenuate harmonic peaks.

1 Acoustic Transducers

In some examples, the acoustic transducers 106 are conventional loudspeaker drivers, each having a diaphragm (e.g., a cone) which moves back and forth to generate pressure waves in the air in front of and behind the diaphragm. The acoustic transducers 106 are disposed through the internal wall 110 and therefore along a length of the acoustic transmission line 104. Due to this arrangement, each transducer 106 is positioned and completely contained within the acoustic waveguide 104 such that the transducer emits acoustic pressure waves in a direction substantially perpendicular to the internal wall 110 and directly into the acoustic transmission line 104 at two separated locations along the length of the acoustic transmission line 104.

For example, focusing on a single acoustic transducer 106*a*, the acoustic transducer 106*a* is disposed through the internal wall 110 such that a front side of the acoustic transducer's diaphragm faces into the acoustic transmission line 104 at a first location, $L_1$, and a back side of the acoustic transducer's diaphragm faces into the acoustic transmission line 104 at a second location, $L_2$, which is separated from $L_1$ along the length of the acoustic transmission line 140.

When an electrical signal is applied to the acoustic transducer 106*a*, the diaphragm of the acoustic transducer moves back and forth. Due to the movement of the diaphragm, the acoustic transducer 106*a* emits acoustic pressure waves from the front of the diaphragm directly into the acoustic transmission line 104 at location $L_1$. The acoustic transducer 106*a* also emits acoustic pressure waves from the back side of the diaphragm directly into the acoustic transmission line 104 at location $L_2$.

In some examples, the acoustic transducers 106 are equally spaced. In other examples, the acoustic transducers 106 are unequally spaced to obtain a desired output characteristic (e.g., to reduce harmonic peaks at high frequencies).

In some examples, the number of acoustic transducers 106 can be increased or decreased, resulting in a corresponding increase or decrease in the total amount of diaphragm area present in the loudspeaker 100. Increasing or decreasing the total amount of diaphragm area causes a corresponding increase or decrease in an output power of the loudspeaker 100. In some examples, having a larger number of acoustic transducers 106 present in the loudspeaker 100 may result in better high frequency performance for the loudspeaker 100 due to an increased cone area which causes a spreading or randomization in the propagation of high frequency harmonic peaks as opposed to acting at a single narrow point. Alternately, a similar effect may be achieved by using fewer acoustic transducers, each with wider (e.g., oblong) cones that also spread out or randomize the propagation of high frequency harmonic peaks. In some examples, a single acoustic transducer with a cone spanning the internal wall 110 may be used.

2 Operation

In operation, an electrical signal is applied to one or more of the acoustic transducers causing the diaphragms of the one or more acoustic transducers to move back and forth. Due to the movement of the diaphragms, the acoustic transducers 106 emit acoustic pressure waves from both the front and back sides of their respective diaphragms directly into the acoustic transmission line 104.

In some examples, the same electrical signal is provided to each of the acoustic transducers 106, causing the acoustic transducers 106 to generate sound pressure waves in phase with one another.

In a simple example, when a sinusoidal electrical signal of sufficiently low frequency is provided in phase to each of the acoustic transducers 106, the back sides of the diaphragms of the acoustic transducers 106 move toward the back sides of the acoustic transducers 106 causing an increase in acoustic pressure in the portion of the acoustic transmission 104 line behind the acoustic transducers 106. Due to the shape of the acoustic transmission line 104, the acoustic pressure generated behind the acoustic transducers 106 propagates through the acoustic transmission line 104, in a direction from the first end 112 of the acoustic transmission line 104 to the second end 114 of the acoustic transmission line 107.

Figure 4:
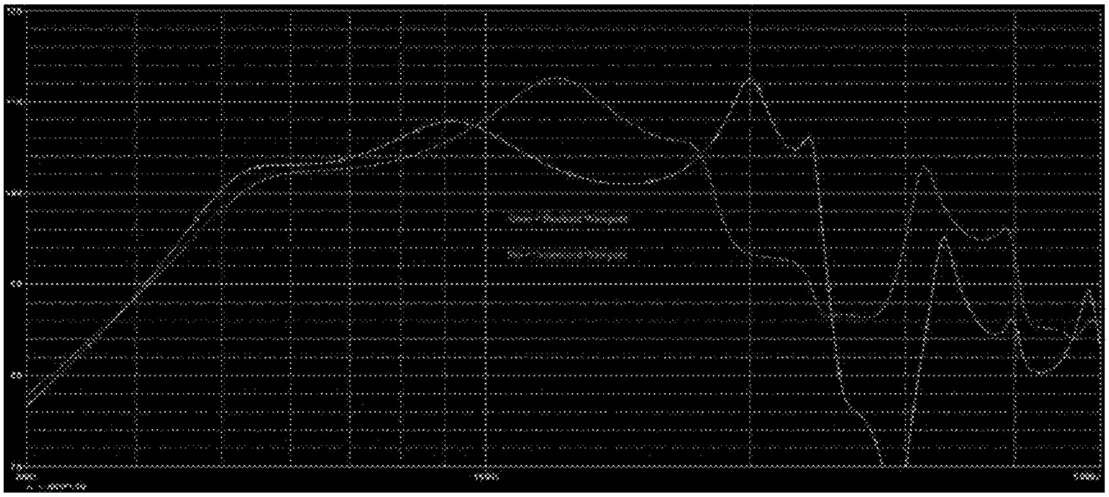
FIG. 4 is a graph of acoustic output vs. frequency for a conventional and a band-pass acoustic transmission line.

As the acoustic pressure propagates into the portion of the acoustic transmission line 104 in front of the acoustic transducers 106, the front sides of the diaphragms of the acoustic transducers 106 move toward the front of the acoustic transducers 106, causing an additional increase in acoustic pressure (i.e., by constructive interference) in the portion of the acoustic transmission line 104 in front of the acoustic transducers 106. In this way, the output of the loudspeaker 100 is boosted at certain frequencies by combining the acoustic pressure generated at the back sides of the acoustic transducers 106 with the acoustic pressure generated at the front sides of the acoustic transducers 106. The combined acoustic pressure propagates to the outside environment 116 through the second end 114 of the acoustic transmission line 104 at the opening 107 in the enclosure 102. Referring to FIG. 4, a plot of system output vs. frequency for a conventional acoustic transmission line (shown in red) and a band-pass waveguide (shown in green) illustrates a boost in output in the region 45 to 95 Hz. and at approximately 200 Hz.

In other examples, the phase of the electrical signal applied to the acoustic transducers 106 is varied to alter the characteristics of the sound pressure waves emitted into the outside environment 116. In some examples, the phase of the electrical signal applied to the acoustic transducer 106 near the closed end 112 of the acoustic transmission line 104 is varied to alter frequency characteristics in a narrow frequency range around the fundamental tuning frequency of the acoustic transmission line 104.

In yet other examples, different electrical signals are applied to each of the acoustic transducers 106 (or to subsets of the acoustic transducers 106) to alter the characteristics of the sound pressure waves emitted into the outside environment 116. For example, one or more acoustic transducers 106 near the closed end 112 of the acoustic transmission line 104 may be supplied with a higher voltage (causing a greater cone excursion) than the other acoustic transducers 106 successively spaced along wall 110. In some examples, doing so has the same acoustic effect as if the inner wall 110 were pivoted at the teardrop shaped member 124 and the portion of the inner wall 110 near the closed end 112 of the acoustic transmission line 104 moved back and forth to generate pressure in the in the acoustic transmission line 104.

Figure 5:
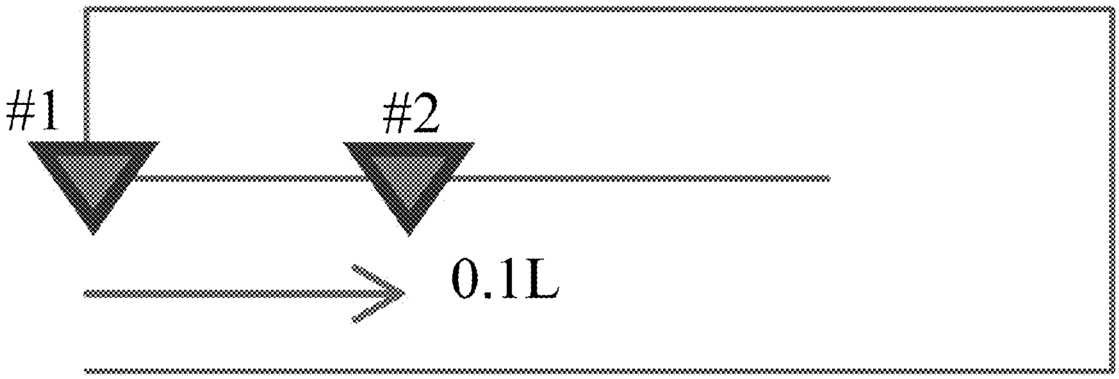
FIG. 5 is a simple example of acoustic transducer placement within an acoustic transmission line.

Referring to FIG. 5, a simple example of an acoustic transmission line illustrates the effects of acoustic transducer placement and acoustic transmission line length. The acoustic transmission line includes two acoustic transducers #1, and #2. Transducer #1 is disposed at the closed end of the acoustic transmission line and acoustic transducer #2 is disposed at $1/10^{th}$ the length of the acoustic transmission line.

Figure 6:
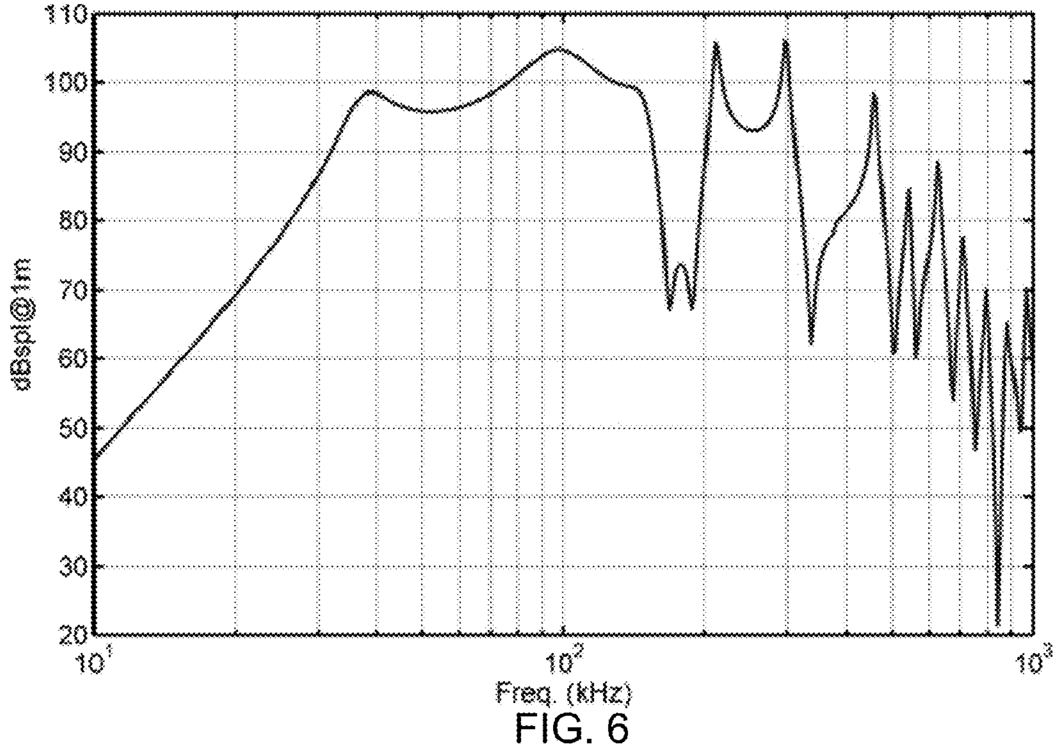
FIG. 6 is a graph of acoustic output vs. frequency for the acoustic transmission line of FIG. 5.
Figure 7:
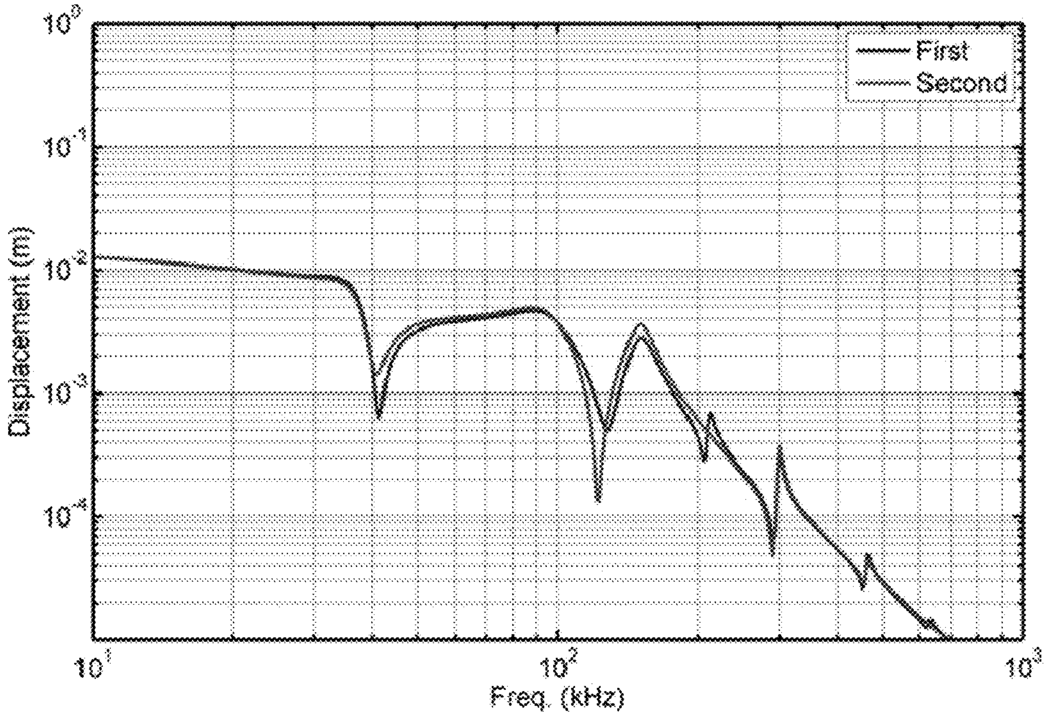
FIG. 7 is a graph of acoustic transducer displacement vs. frequency for the acoustic transducers of FIG. 5.

Referring to FIGS. 6 and 7, the system output vs. frequency as measured at 1 m from the opening of the acoustic transmission line of FIG. 5 and the acoustic transducer displacement vs. frequency of the two acoustic transducers of FIG. 5 are illustrated, respectively.

Figure 8:
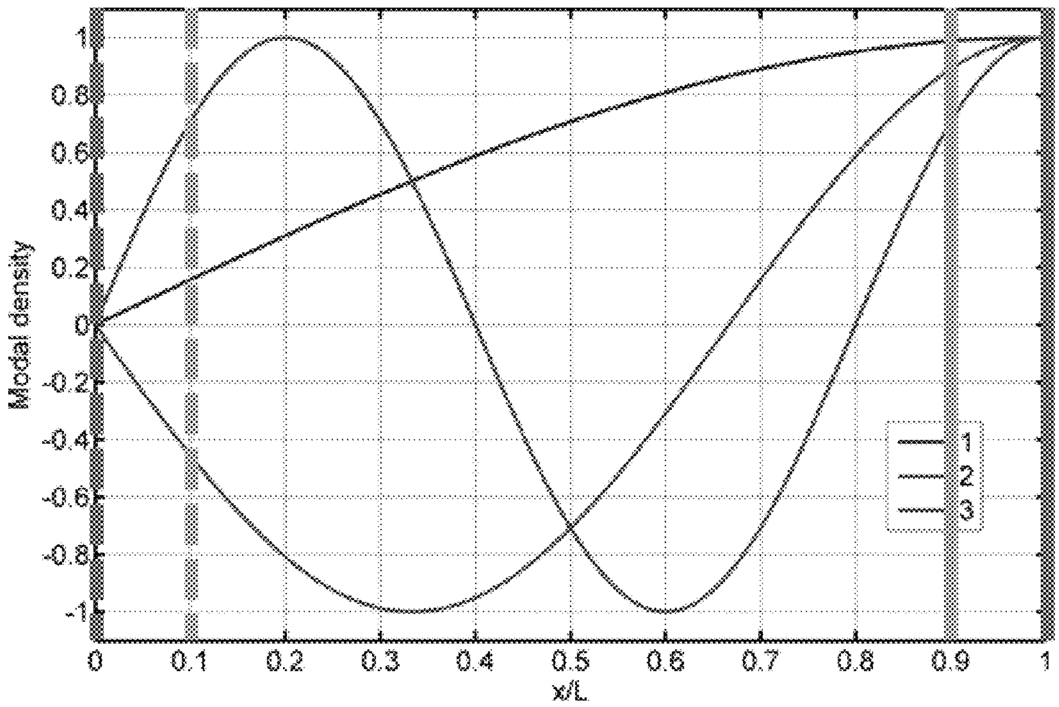
FIG. 8 is a graph illustrating pressure load on the acoustic transducers of FIG. 5 at different positions in the modal distribution.

Referring to FIG. 8, the pressure load from the modes of the waveguide on the two acoustic transducers of FIG. 5 is illustrated along with the positions of the acoustic transducers in the modal distribution. In FIG. 8, the first acoustic transducer is sketched in blue with the front of the driver a solid line and the back a dashed line, similarly, the second acoustic transducer's position is shown in green.

It can be seen that at the first mode (shown in blue) the first acoustic transducer has high pressure on the front and little to no pressure on the back; the mode loads the acoustic transducer heavily at this frequency and reduces the displacement as seen at around 41 Hz in the acoustic transducer displacement plot of FIG. 7. The second acoustic transducer is in a similar situation, with high pressure (but slightly lower than the first acoustic transducer) on the front and low pressure (but above zero) on the back, so, again, the mode loads the acoustic transducer and reduces displacement. The effect is smaller than on the first acoustic transducer because the pressure change is smaller—this can be seen in the displacement plot of FIG. 7.

For the second mode (shown in green), the first acoustic transducer is again at high pressure on the front and low pressure on the back. The second acoustic transducer is at high pressure on the front and negative pressure on the back. The second mode very heavily loads the second acoustic transducer so the acoustic transducer displacement goes down significantly, as seen in the displacement plot of FIG. 7.

Finally, for the third mode (shown in red), the first acoustic transducer is at high pressure on the front and zero pressure on the back. The second acoustic transducer, however, is at high pressure on the both the front and the back so this mode doesn't load this acoustic transducer and the displacement is unaffected in the displacement plot of FIG. 7.

3 Experimental Results

Figure 9:
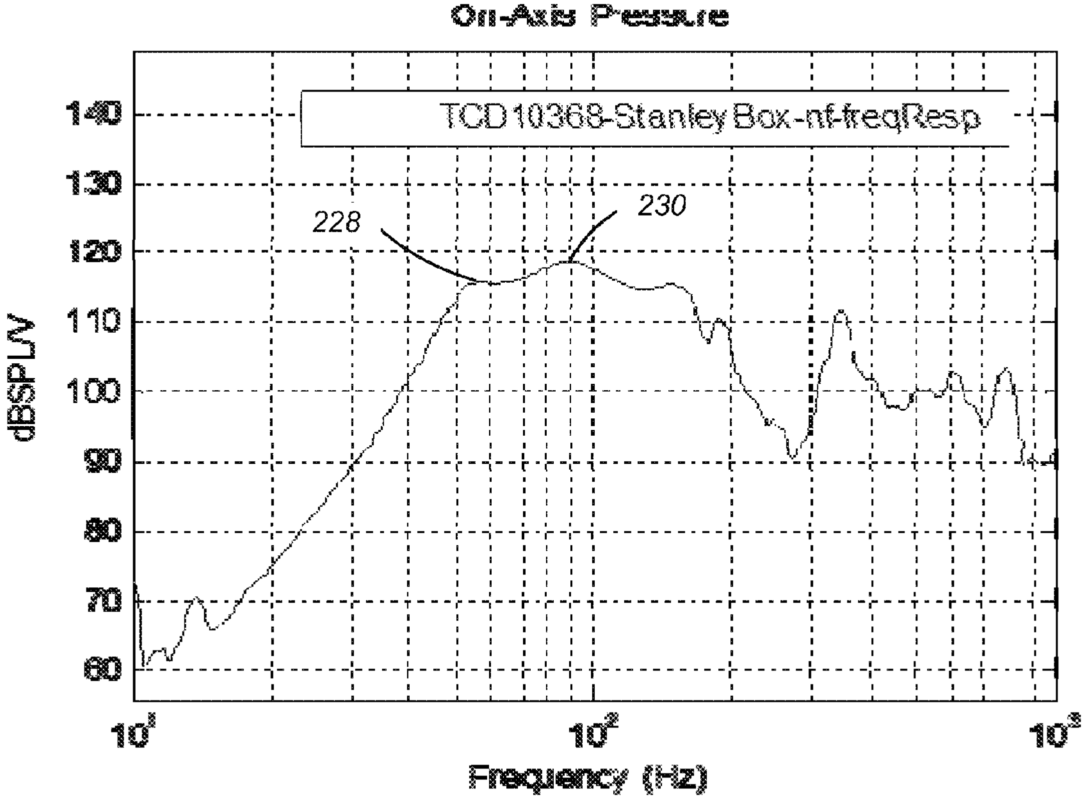
FIG. 9 is a graph of on-axis pressure produced by a loudspeaker including an acoustic transmission line vs. frequency.

Referring to FIG. 9, a graph of on-axis acoustic pressure vs. frequency is presented for one exemplary configuration of the loudspeaker 100 of FIG. 1. The example loudspeaker 100 used to generate the data shown in the graph has an acoustic transmission line 104 with a length of 2 m, a 4° angle of taper, and an opening 107 with an area of $7E^{-3}$ $m^2$.

Due to the above-described physical characteristics of the loudspeaker 100, the graph of on-axis pressure vs. frequency includes a first "fundamental" resonant peak 228 at approximately 52 Hz and a second resonant peak 230 at approximately 95 Hz. The second resonant peak 230 is the first harmonic of the fundamental resonant peak 228 occurring at 52 Hz. In some examples, internal turbulence and absorbent material can alter the frequency of the second resonant peak 230.

Together, the two resonant peaks, which are closely grouped in frequency, result in a band-pass effect in the output of the loudspeaker 100 by boosting the output in the frequency range of 52 Hz-156 Hz and attenuating the output at frequencies above approximately 180 Hz.

Figure 10:
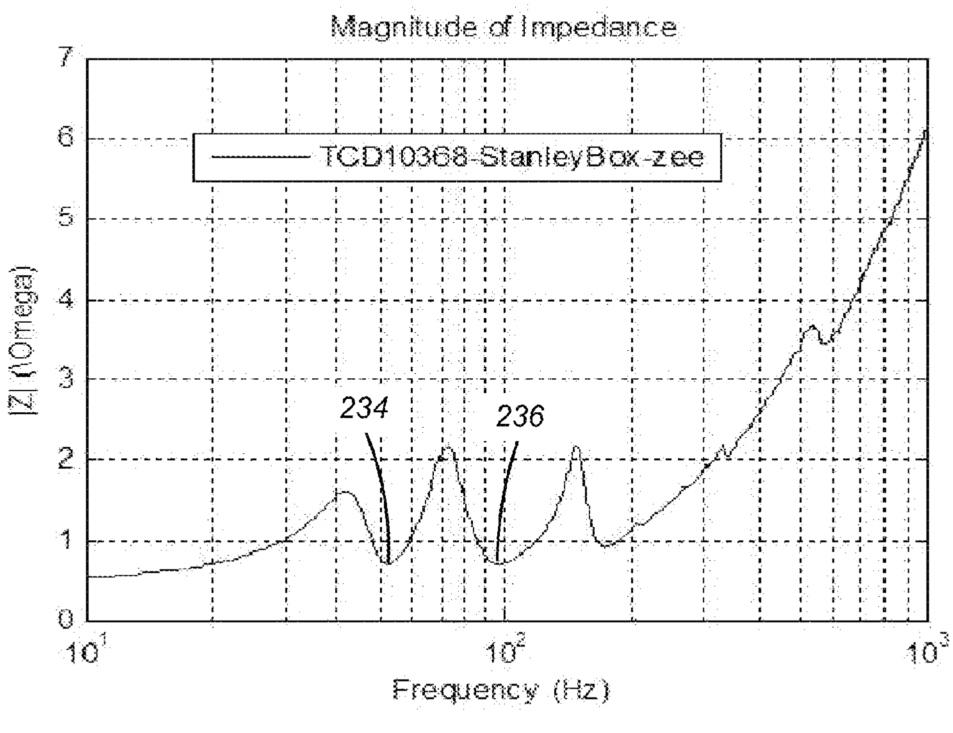
FIG. 10 is a graph of the magnitude of the impedance of a loudspeaker including an acoustic transmission line vs. frequency.

Referring to FIG. 10, a graph of the magnitude of the output impedance of the example loudspeaker 100 described above includes a first impedance minimum 234 (indicating that a motion null near is nearby in frequency) at approximately 52 Hz and a second impedance minimum 236 at approximately 95 Hz.

When viewing FIG. 10 in light of FIG. 9, it becomes apparent that the two impedance minima 234, 236 in FIG. 10 are, as expected, approximately frequency aligned with the two resonant peaks 228, 230 of FIG. 9.

In some examples of closed ended acoustic transmission lines, a first motion null or impedance minimum occurs when the length of the waveguide is equal to ¼λ, where λ is the wavelength of the frequency being reproduced. A second motion null occurs when the length of the acoustic transmission line is equal to ¾λ, and a third motion null occurs at 5/4λ, and so on.

4 Alternative Embodiments

Figure 11:
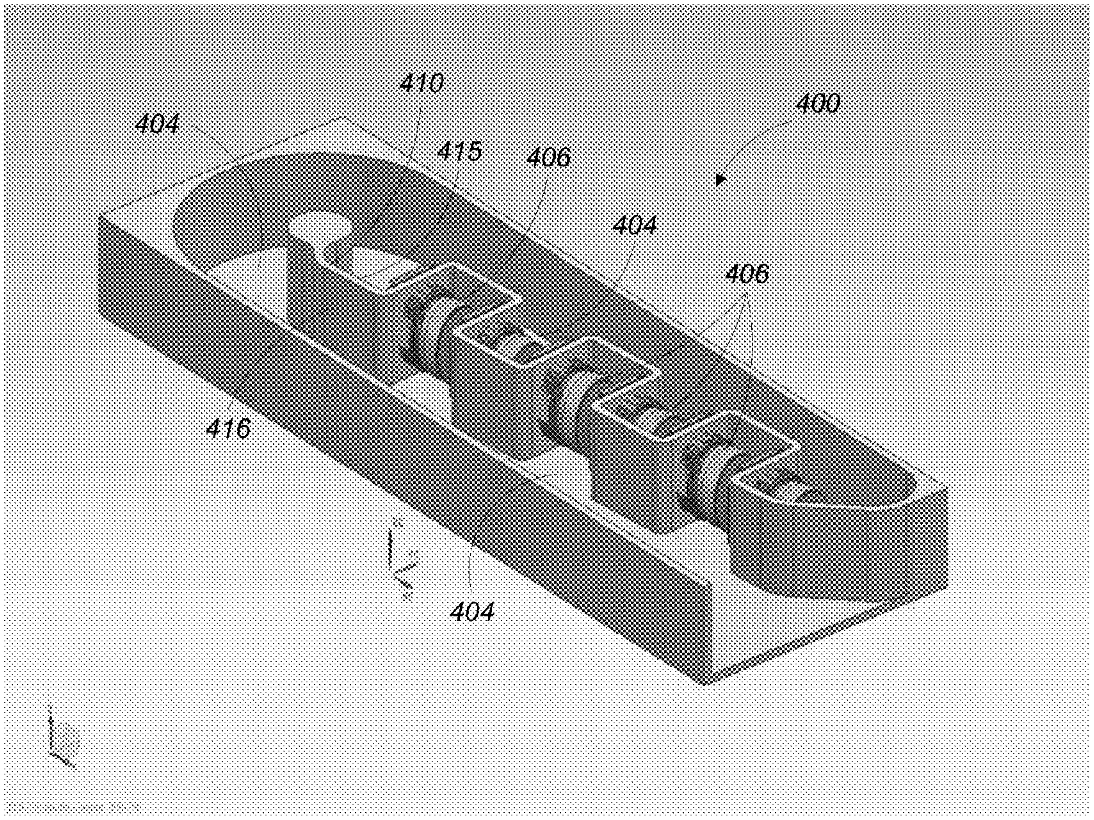
FIG. 11 is a second embodiment of a loudspeaker including an acoustic transmission line.

Referring to FIG. 11, another example of a loudspeaker 400 is similar to the loudspeaker 100 of FIG. 1 with the exception that the loudspeaker 400 has a corrugated internal wall 410 and a non-tapering acoustic transmission line 404.

Owing to the corrugated shape of the internal wall 410, acoustic transducers 406 can be installed in the internal wall 410 with an alternating direction of installation. That is, at least some of the acoustic transducers 406 are installed with their front sides facing outward from a first side 415 of the internal wall 410 and the remaining acoustic transducers 406 are installed with their front sides facing outward from a second, opposite side 416 of the internal wall 410. In some examples, the alternating direction of installation of the transducer 406 reduces harmonic distortion due to a change in cone area that results from the cone travelling inward and outward in the acoustic transducer.

Furthermore, the corrugated wall allows for the acoustic transducers 406 to be disposed through the internal wall 410 such that they emit acoustic pressure waves in a direction substantially parallel to a direction of extension of the internal wall 410 and directly into an acoustic transmission line 404 at two separated locations along the length of the acoustic transmission line 404.

The above-described arrangement of the acoustic transducers 406 in the corrugated internal wall 410 acts to reduce or cancel unwanted vibrations in the internal wall 410. The corrugated internal wall 410 can also permit use of a reduced length acoustic transmission line 404 while maintaining the same number of acoustic transducers 406 (e.g., to reduce the overall size of the loudspeaker 400) or to increase the number of acoustic transducers 406 while maintaining the length of the acoustic transmission line (e.g., to increase the output power of the loudspeaker 400).

Figure 12:
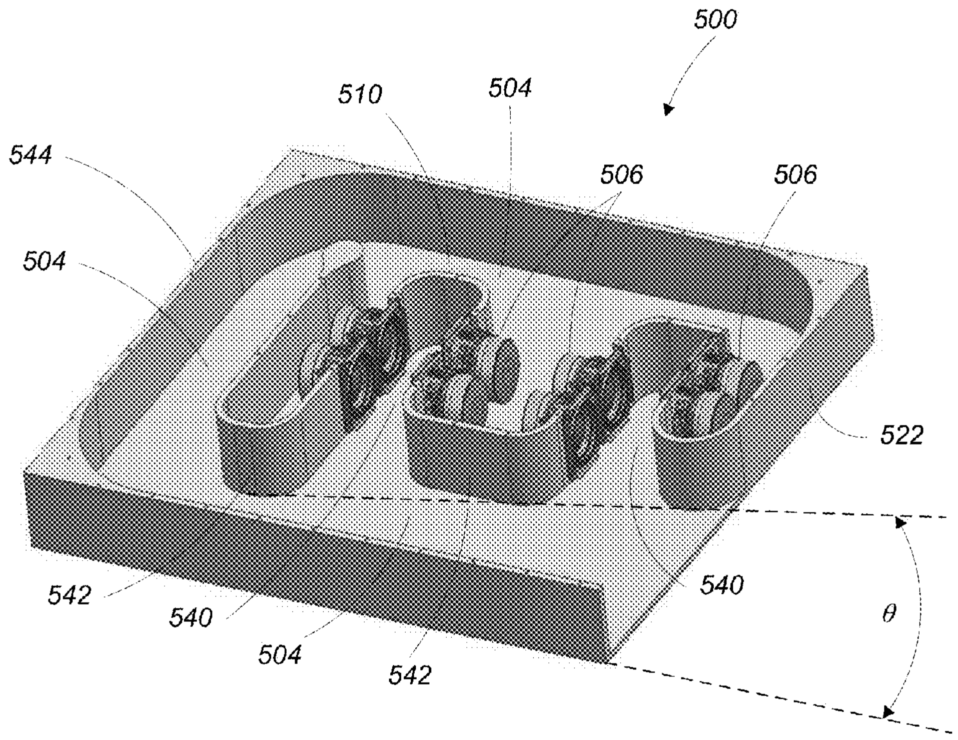
FIG. 12 is a third embodiment of a loudspeaker including an acoustic transmission line.

Referring to FIG. 12, another example of a loudspeaker 500 is similar to the loudspeaker 100 of FIG. 1 with the exception that internal wall 510 of the loudspeaker 500 is corrugated (having corrugation grooves 540 and corrugation ridges 542) and is tapered.

Due to the corrugated shape of the internal wall 510 of the loudspeaker 500, acoustic transducers 506 included in the loudspeaker 500 are disposed through the internal wall 510 such that they emit acoustic pressure waves in a direction substantially parallel to a direction of extension of the internal 510 and directly into an acoustic transmission line 504 at two separated locations along the length of the acoustic transmission line 504.

Furthermore, the acoustic transducers 506 are installed in the internal wall 510 such that the front sides of the acoustic transducers 506 facing into a given corrugation groove 540 face one another and the back sides of the acoustic transducers 506 facing into another, different corrugation groove 540 face one another.

The above-described arrangement of the acoustic transducers 506 in the corrugated internal wall 510 acts to reduce or cancel unwanted vibrations in the internal wall 510. The corrugated internal wall 510 can also permit use of a reduced length acoustic transmission line 504 while maintaining the same number of acoustic transducers 506 (e.g., to reduce the overall size of the loudspeaker 500 or to change the form factor of the loudspeaker 500) or to increase the number of acoustic transducers 506 while maintaining the length of the acoustic transmission line (e.g., to increase the output power of the loudspeaker 500).

In some examples, the corrugation grooves 540 of the corrugated internal wall 510 increase in depth as the corrugated internal wall 510 extends from a front side 522 of the enclosure 502 of the loudspeaker 500 to a back side 544 of the enclosure 502. This increase in corrugation groove depth causes at least some of the acoustic transmission line 504 to taper at an angle, θ. The taper in the acoustic transmission line 504 provides the similar benefits as the taper in the acoustic transmission line 104 of FIG. 1.

Referring to FIGS. 6-11, a number of alternative loudspeaker configurations include multiple drivers disposed in various configurations within acoustic transmission lines of various shapes and sizes.

Figure 13:
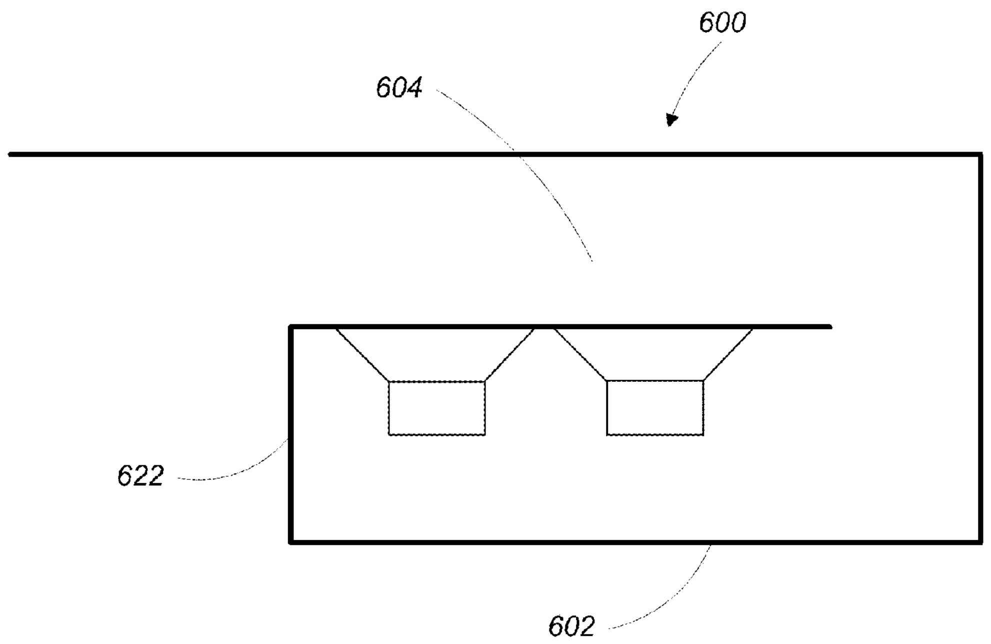
FIG. 13 is a fourth embodiment of a loudspeaker including an acoustic transmission line.
Figure 14:
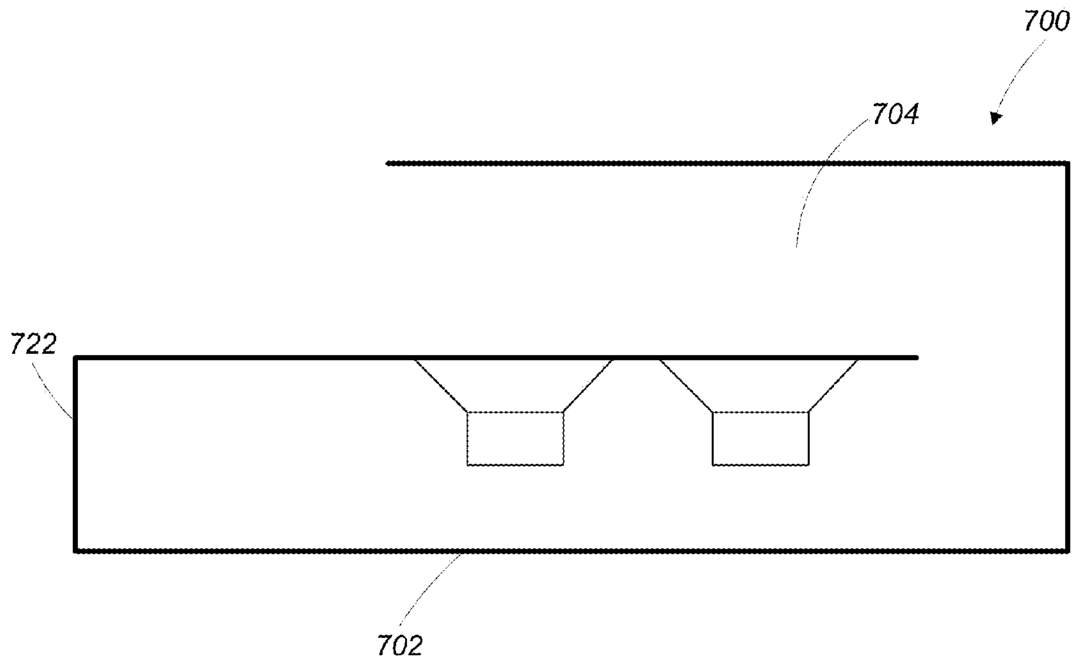
FIG. 14 is a fifth embodiment of a loudspeaker including an acoustic transmission line.
Figure 15:
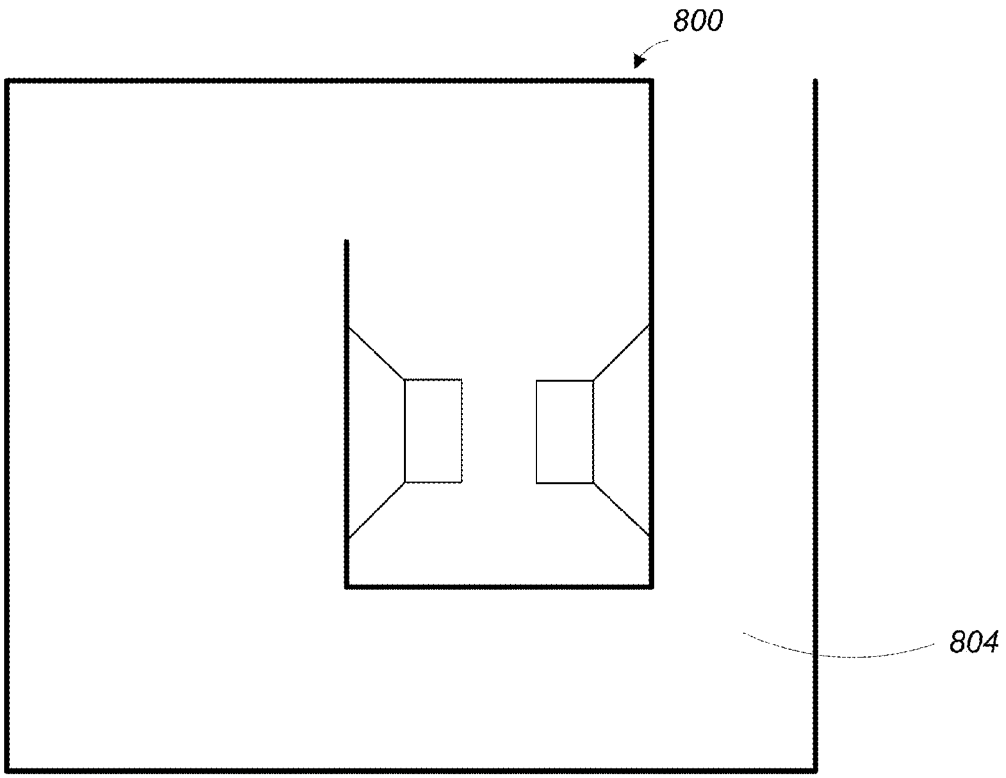
FIG. 15 is a sixth embodiment of a loudspeaker including an acoustic transmission line.
Figure 16:
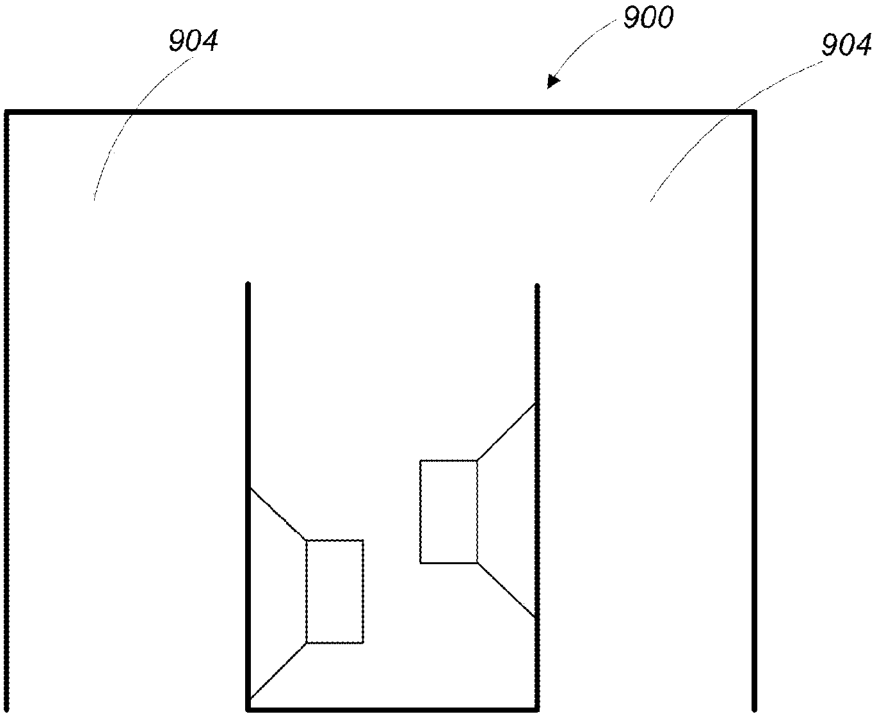
FIG. 16 is a seventh embodiment of a loudspeaker including an acoustic transmission line.
Figure 17:
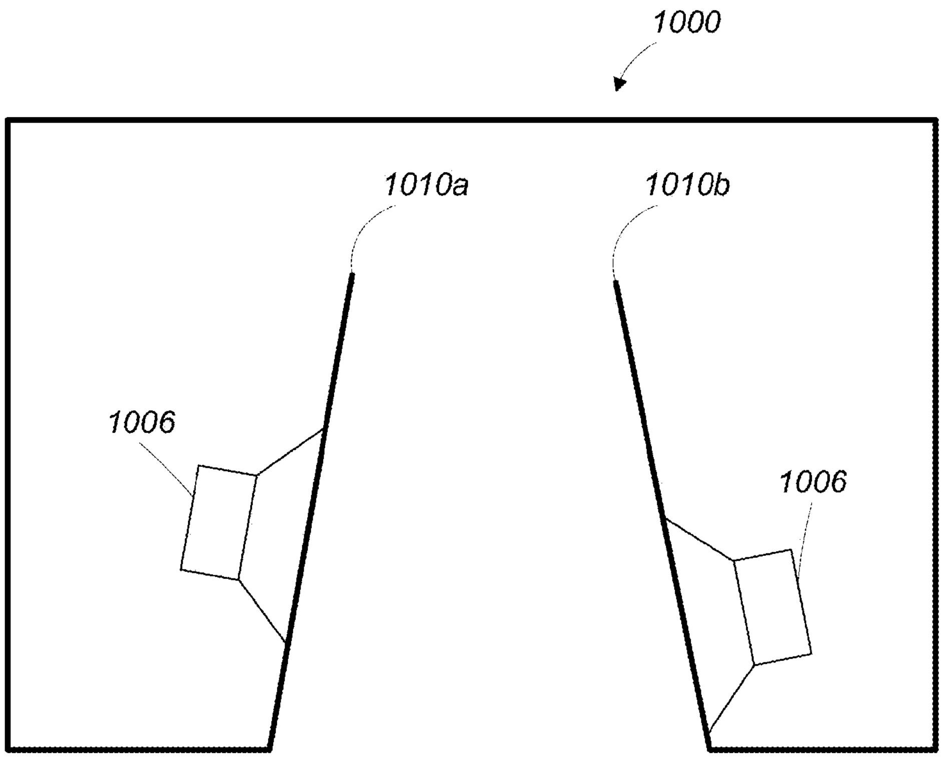
FIG. 17 is an eighth embodiment of a loudspeaker including an acoustic transmission line.
Figure 18:
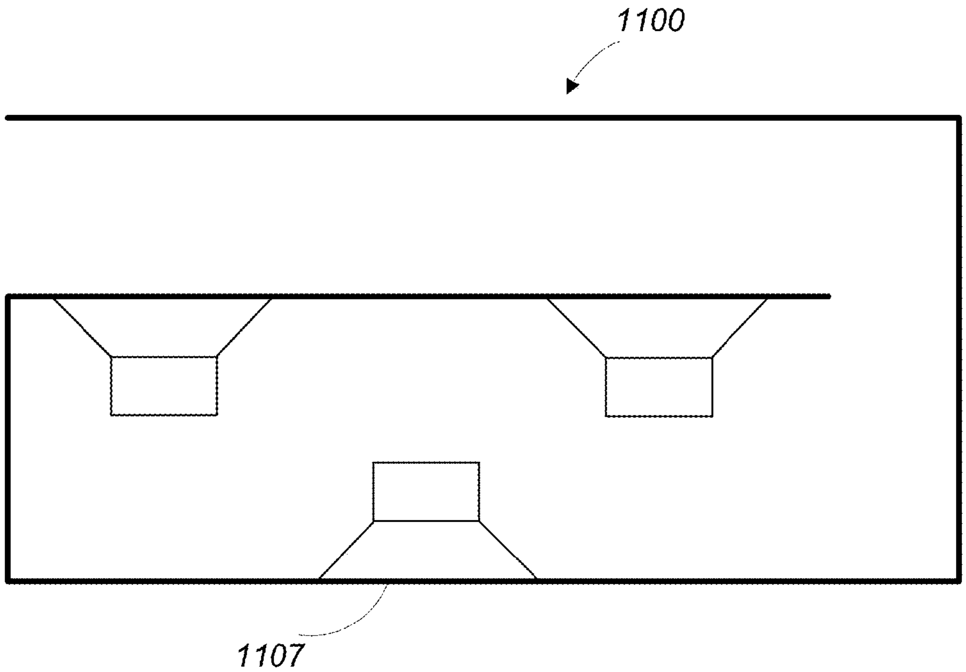
FIG. 18 is a ninth embodiment of a loudspeaker including an acoustic transmission line.

Referring to FIG. 13, one alternative loudspeaker configuration 600 has an acoustic transmission line 604 extending past a first end 622 of an enclosure 602. Referring to FIG. 14, another alternative loudspeaker configuration 700 has an acoustic transmission line 704 which does not extend all the way to a first end 722 of an enclosure 702. Referring to FIG. 15, another alternative loudspeaker configuration 800 has a lengthened and substantially spiraling acoustic transmission line 804. Referring to FIG. 16, another alternative loudspeaker configuration 900 has a bifurcated acoustic transmission line 904. Referring to FIG. 17, another alternative loudspeaker configuration 1000 has two internal walls 1010*a*, 1010*b*, each having an acoustic transducer 1006 disposed therein. Referring to FIG. 18, another alternative "hybrid" loudspeaker configuration 1100 has one of its acoustic transducers 1107 emitting directly into an outside environment 1116.

As described herein, an acoustic folded transmission line waveguide can be designed to include a compact enclosure and one or more electro-acoustic drivers or transducers. To provide bass reinforcement, waveguide systems provide any number of resonant modes, including a desirable fundamental mode that can reinforce an output at low frequencies. However, the higher frequency resonant modes of a waveguide system can lead to an uneven frequency response and be detrimental to the range of operation of the waveguide. Accordingly, it is desirable for a waveguide system to be configured to suppress the higher frequency waveguide modes.

One approach is to reduce the height of such peaks by positioning foam or other absorbent material in the waveguide. However, this approach undesirably lowers the waveguide output at the lowest frequencies, and accordingly, impacts the fundamental mode.

Figure 19:
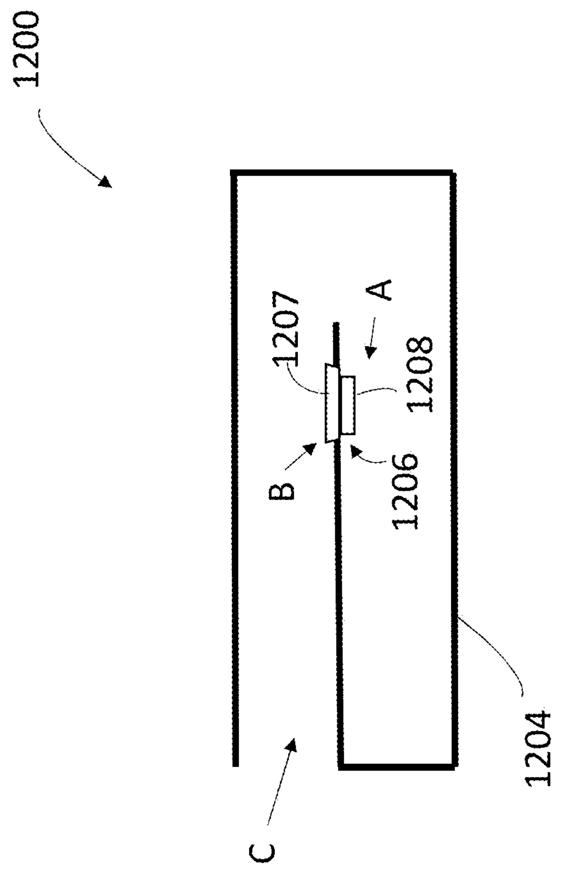
FIG. 19 is an illustration of an acoustic folded transmission line pass-band waveguide system.

FIG. 19 is another embodiment of a waveguide system 1200 that includes at least one electro-acoustic driver 1206 positioned within an acoustic folded transmission line pass-band waveguide 1204. The at least one electro-acoustic driver 1206 has a front side 1207 and a back side 1208, both of which emit acoustic energy directly into the acoustic transmission line.

The waveguide 1204 includes at least one electro-acoustic driver 1206 that drives the waveguide 1204 at two locations, i.e., at the back of the electro-acoustic driver 1206 (location A) and at the front of the electro-acoustic driver 1206 (location B). However, the waveguide 1204 is configured to have a single output at the opening of the waveguide 1204 (location C). The waveguide 1204 can have a uniform cross-sectional area, for example, a rectangular cross-section or a hollow tube of a uniform cross-sectional area. Alternatively, the waveguide 1204 can have a non-uniform cross-sectional area, for example, a hollow tube of a narrowing cross-sectional area such as a taper configuration shown and described herein. The internal and external walls of the waveguide 1204 may be substantially straight or curved. The one or more electro-acoustic drivers 1206 may be positioned in a number of locations along an internal wall of the waveguide 1204.

Figure 20:
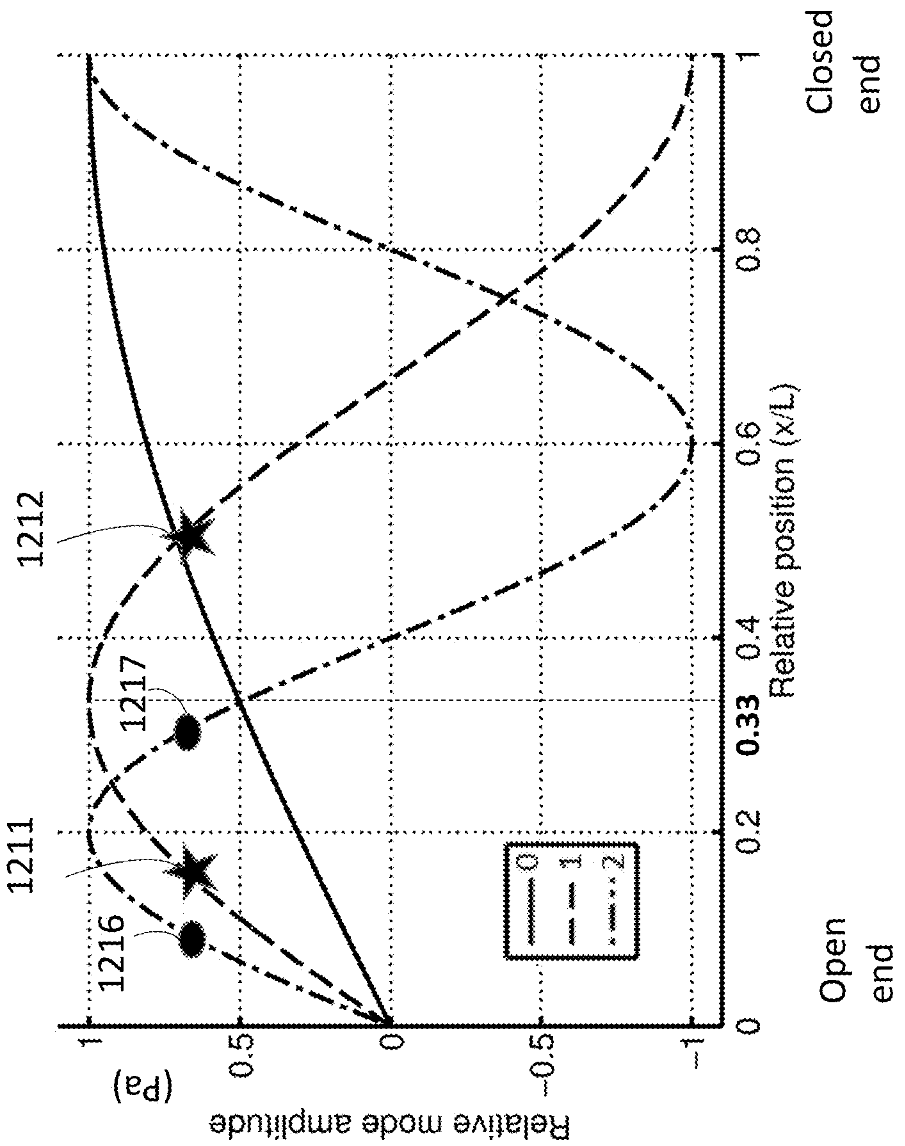
FIG. 20 is a graph of pressure amplitude of three resonant modes of the waveguide system of FIG. 19.

As discussed above, waveguide systems produce a number of resonant modes. FIG. 20 is a graph of pressure amplitude of three resonant modes of the waveguide system 1200 of FIG. 19. The three resonant modes are plotted against x/L of the waveguide tube shown in FIG. 19 (described below), with the open end (location C) at the left side of the graph and the closed end at the right side of the graph. Although three resonant modes are illustrated, the waveguide system 1200 can have any number of resonant modes. The illustrated resonant modes are the first three resonant modes of the waveguide system 1200 of FIG. 19, i.e., Modes 0, 1, and 2. Mode 0 is typically referred to as the fundamental mode. The modes can be numbered in the order of increasing frequency. The modes will vary depending on the geometry of the waveguide, and the modes shown in FIG. 20 are just exemplary.

FIG. 20 can be used to determine the position of one or more electro-acoustic drivers 1206 within the waveguide 1204, such that the electro-acoustic drivers 1206 prohibit excitation of undesirable resonance frequencies above the fundamental mode, i.e., Mode 0. As described above, the electro-acoustic driver 1206 drives the waveguide 1204 at two locations in the front and back of the electro-acoustic driver 1206 (locations A and B). The pressure produced by electro-acoustic driver 1206 in the front of the transducer is 180-degrees out of phase with that behind it. Accordingly, one or more electro-acoustic drivers 1206 can be positioned within the waveguide such that the front and rear of the drivers are driving the first mode equally, but in opposite directions, effectively preventing that mode from being excited.

As shown in FIG. 20, the first resonant mode (Mode 1) above the fundamental mode (Mode 0) has a peak when x/L is approximately ⅓, where x/L is the relative distance from the open end of the waveguide 1204 along the walls of the waveguide 1204, where L is the length of the waveguide 1204 and x is the distance from the open end). At this peak, the pressure amplitude is highest. Thus, to prevent Mode 1 from being excited, one or more electro-acoustic drivers can be positioned such that a front side and a rear side of the drivers are symmetric about the peak of Mode 1, i.e., where x/L is approximately ⅓. In this manner, the front 1207 and rear 1208 of the driver 1206, respectively, cancel each other out at Mode 1. There are several such positions symmetric about the peak, indicating that the front and back of the electro-acoustic driver 1206 load that particular mode, i.e., Mode 1, equally and in opposite phase. The two stars 1211, 1212 shown in FIG. 20 identify two such positions along the Mode 1 plot. The location of the stars 1211, 1212 indicate that the electro-acoustic driver 1206 is positioned within the waveguide 1204, more specifically, placed symmetrically about the position on the acoustic transmission line where x/L is approximately ⅓, for prohibiting excitation of the first mode (Mode 1) above the fundamental mode (Mode 0).

Similarly, one or more electro-acoustic drivers can be positioned to prohibit excitation of the second resonant mode (Mode 2) above the fundamental mode (Mode 0). As shown in FIG. 20, the second resonant mode (Mode 2) has a peak when x/L is approximately ⅕. At this peak, the pressure amplitude is highest. Thus, to prevent Mode 2 from being excited, one or more electro-acoustic drivers can be positioned such that a front side and a rear side of the drivers are symmetric about the peak of Mode 2, i.e., where x/L is approximately ⅓. In this manner, the front 1207 and rear 1208 of the driver 1206, respectively, prohibit excitation of Mode 2. The two ovals 1216, 1217 shown in FIG. 20 identify two positions along the Mode 2 plot that are symmetric about the peak, indicating that the front and rear of the driver 1206 load the particular mode, i.e. Mode 2, equally and in opposite phase. Other locations of symmetry can be found along the plot for Mode 2. Although three resonance modes are shown in FIG. 20, any number of modes could be suppressed using the techniques described herein. Moreover, as described above, the modes will vary depending on the waveguide geometry, so in other examples, the locations of the peaks (and thus the locations of symmetry) will vary.

Figure 21:
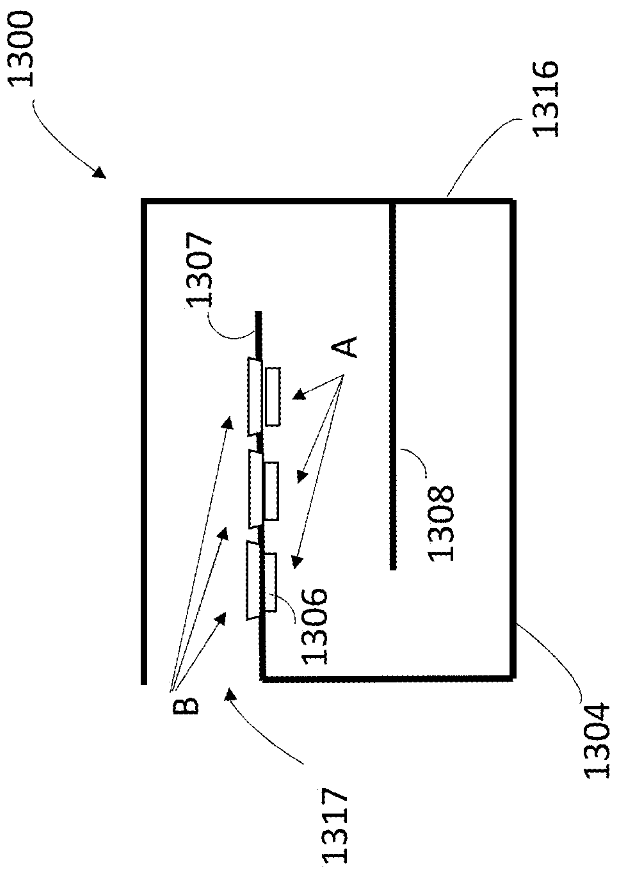
FIG. 21 is another example of an acoustic folded transmission line pass-band waveguide system.
Figure 22:
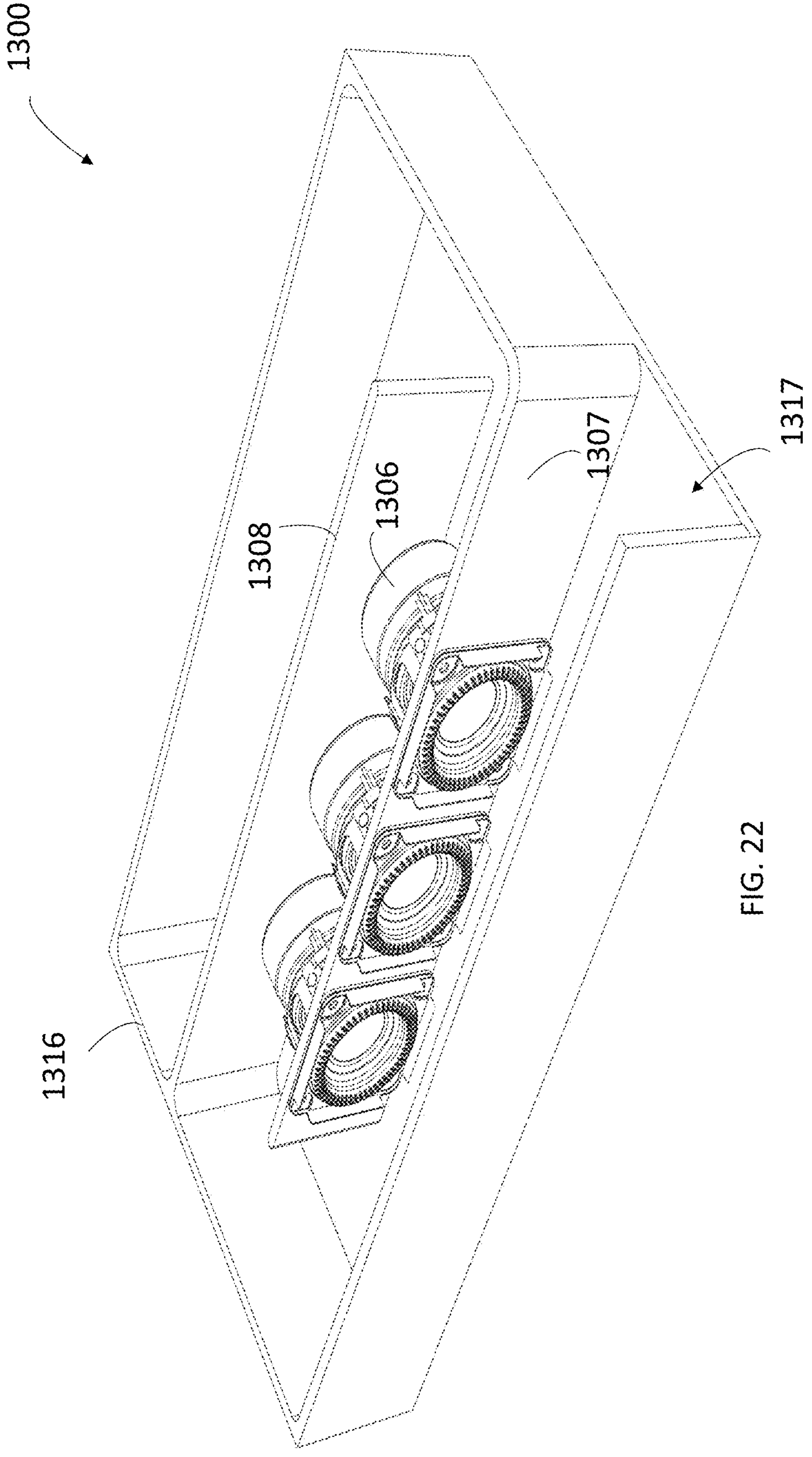
FIG. 22 is a perspective view of the acoustic folded transmission line pass-band waveguide system of FIG. 21.

Applying principles from the graph illustrated at FIG. 20, i.e., that one or more electro-acoustic drivers should be placed within a waveguide symmetrically about a point on the acoustic transmission line where a resonant mode is at its peak, one or more electro-acoustic drivers can be positioned within the waveguide in a manner that prevents excitation of one or more modes above the fundamental mode. FIGS. 21 and 22 illustrate an acoustic folded transmission line pass-band waveguide system with multiple electro-acoustic drivers positioned within the waveguide in a manner that prohibits excitation of the first mode (Mode 1) above the fundamental mode (Mode 0). More specifically, the electro-acoustic drivers are positioned symmetrically about the one-third point along the acoustic transmission line. FIG. 21 is an embodiment of a geometry of a plurality of electro-acoustic drivers 1306 within an acoustic folded transmission line pass-band waveguide system 1300. FIG. 22 is a perspective view of the acoustic folded transmission line pass-band waveguide system 1300 of FIG. 21. As described herein, waveguide system 1300 is constructed and arranged to prohibit excitation of only one resonant mode, e.g., Mode 1 or Mode 2, but not both Mode 1 and Mode 2.

As shown in FIGS. 21 and 22, the system 1300 includes a waveguide 1304 that is folded so that multiple drivers, transducers, or the like, for example, electro-acoustic drivers 1306, are arranged about or approximately about the one-third point along the acoustic transmission line, or first fold, of the two-fold waveguide 1304. The two folds of the waveguide 1304 are demarcated by internal walls 1307 and 1308, respectively, to form multiple boundaries. In this example, the length of the folds are substantially the same, but in other examples, they could be different.

The waveguide 1304 includes a closed end 1316 and an opening 1317 at an open end. In operation, acoustic energy present in the transmission line propagates from the closed end 1316 and into an outside environment through the opening 1317.

The electro-acoustic drivers 1306 are disposed through the internal wall 1307 so that the rear of each electro-acoustic driver 1306 faces internal wall 1308. The electro-acoustic drivers 1306 are at positions approximately symmetrical about the one-third point (e.g., x/L=0.33 of FIG. 20) of the acoustic transmission line. The front and rear of the electro-acoustic drivers 1306 are 180-degrees out of phase, so the drivers are positioned such that they will drive Mode 1 equally and out of phase. The net result is that Mode 1 is not excited by the drivers 1306. Although three drivers are shown in FIGS. 21 and 22, any number of drivers could be used, as long as they are positioned symmetrically about approximately the one-third point along the acoustic transmission line.

Accordingly, referring again to FIG. 20, the Mode 1 line can illustrate a smoother response since the first resonance above the fundamental (Mode 0) is removed from the output. For example, the dip shown in FIG. 23 at 124 Hz is removed. In particular, the folded waveguide 1304 with the drivers positioned approximately symmetrically about the one-third (⅓s) point as shown in FIGS. 20-23 permits drivers 1306 to be symmetrically positioned about the peak of Mode 1. Since the front and back of electro-acoustic drivers 1306 are out of phase, the net effect is that Mode 1 of the waveguide is not excited.

Figure 23:
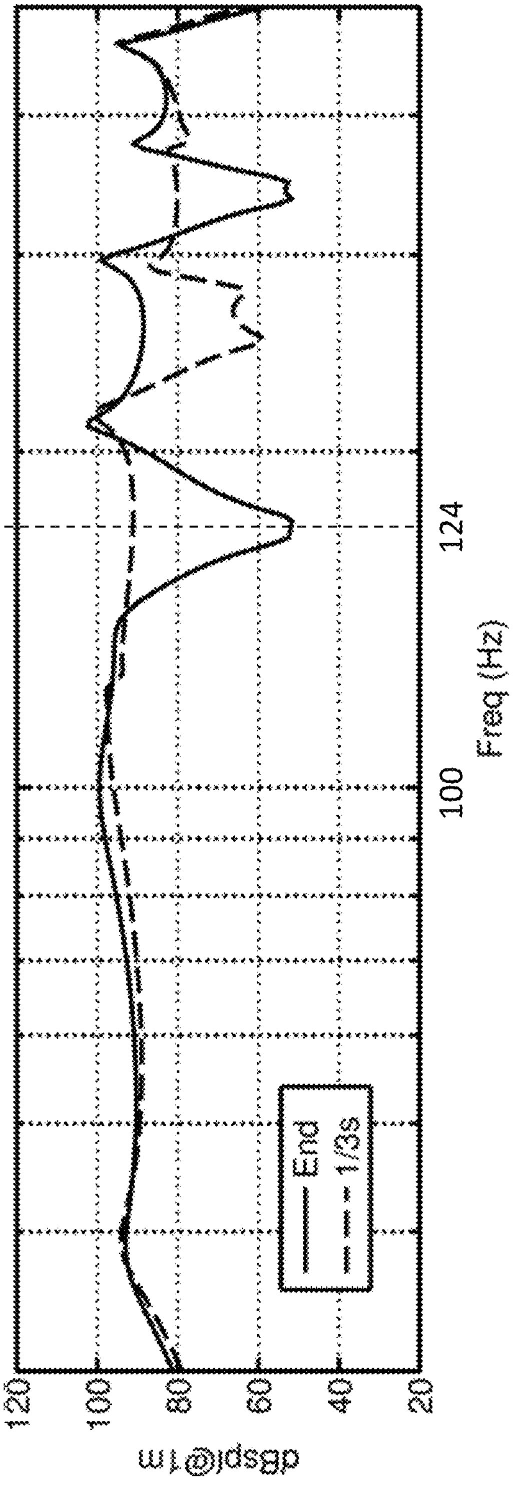
FIG. 23 is a graph illustrating a difference in acoustic output vs. frequency between the waveguide system of FIG. 19 and the waveguide system of FIGS. 21 and 22.

In sum, the position of one or more electro-acoustic drivers 1306 symmetrically about the one-third point does not drive the first mode above the fundamental mode (Mode 0), permitting any number of electro-acoustic drivers 1306 to be located in a space along the interior of the waveguide, and thereby permitting the system 1300 to produce a greater output while still providing a response as shown in the graph of FIG. 23.

Figure 24:
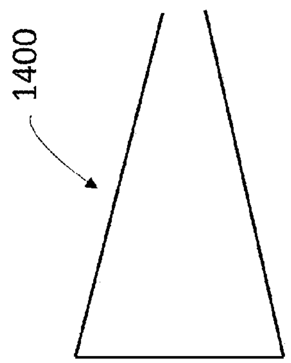
FIG. 24 is an embodiment of a tapered waveguide.
Figure 25:
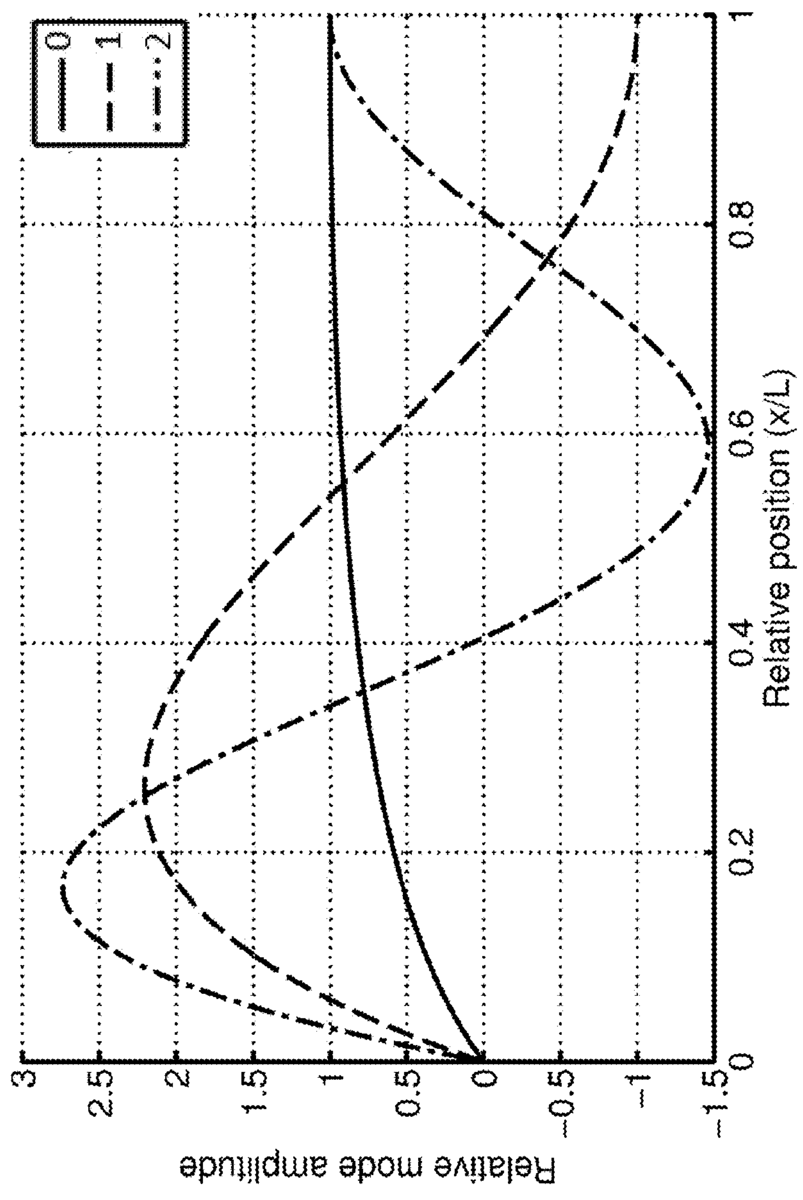
FIG. 25 is a graph of a pressure amplitude of three resonant modes of the tapered waveguide of FIG. 24.

FIG. 24 is an embodiment of a tapered waveguide 1400, i.e., one in which the maximum width is at the closed end of the waveguide, and the edges of the waveguide decrease in width when moving away from the closed end. FIG. 25 is a graph of pressure amplitudes of three resonant modes of the tapered waveguide 1400 of FIG. 24.

As previously described with regard to FIG. 20, the peak amplitude of the first mode (Mode 1) above the fundamental mode is at about x/L=0.33 for a straight waveguide 1200. The symmetric shape of Mode 1 in FIG. 20 allows multiple drivers to be positioned symmetrically, for example, as shown in FIGS. 21 and 22, in order to generate a greater output from the waveguide system, due in part by preventing the excitation of higher order modes.

The graph in FIG. 25 illustrates modes of a waveguide 1400 having a closed end that is about twenty times larger than the open end (though in practice, other sized ends could be used, producing a different ratio between the closed end and the open end). In the graph of FIG. 25, the shape of the modes of the tapered waveguide 1400 are shifted slightly towards the open end of the waveguide 1400 as compared to a straight waveguide, for example, as shown in FIG. 20. Moreover, Mode 1 shown in FIG. 25 is not symmetric about its peak, i.e., x/L=0.30. Thus, electro-acoustic drivers positioned symmetrically about this point do not enjoy the same advantage as that shown and described in FIGS. 20-22, i.e., preventing the excitation of higher order modes.

Figure 26:
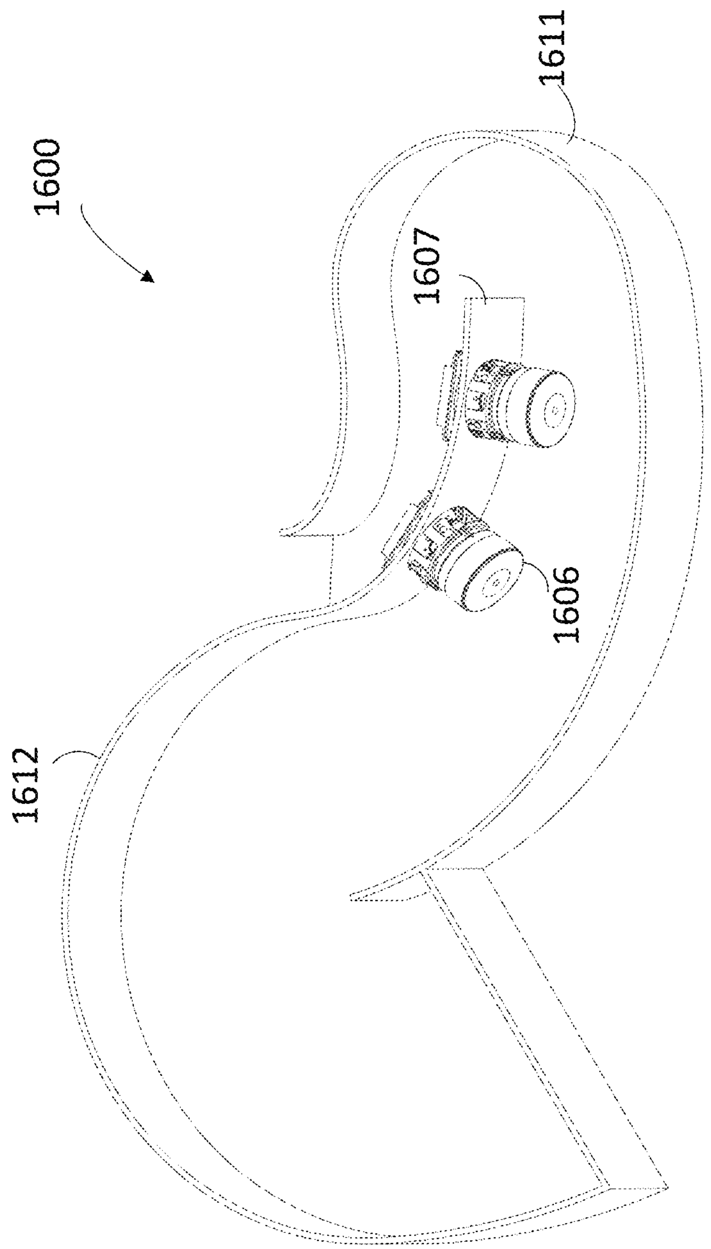
FIG. 26 is an embodiment of a curved geometry for a tapered waveguide system.

FIG. 26 is an embodiment of a tapered waveguide 1600 having internal and external walls having a curved geometry. The waveguide 1600 includes a curved wall 1607 at which one or more electro-acoustic drivers 1606 are positioned that drive a first mode (Mode 1) at the same amplitude and phase on the front and back of electro-acoustic driver 1606. For example, the curved geometry may include an interior wall comprising a fold of the waveguide such that the wall includes locations along the wall such that distances on one side of the wall versus the other side of the wall maintains a match in pressure amplitude according to a mode function. Accordingly, the waveguide 1600 can be curved to exploit the same or similar benefit as the straight waveguide of FIGS. 20-22. Although two electro-acoustic drivers 1606 are shown in FIG. 27, any number of electro-acoustic drivers could be used.

To determine the curved shape for the tapered waveguide 1600, the graph in FIG. 25 can be referenced. Locations are determined along the Mode 1 curve in FIG. 25 that match in amplitude about the peak on the left of the Mode 1 curve, even if these locations are not symmetric about the peak. The determined matching pairs can provide the path length difference between each side of the wall 1607 shown in FIG.

26 such that the curvature of the waveguide 1600 at each discrete step away from the open end of the waveguide can be calculated, such that the distance on one side of the waveguide 1600 versus the other side of the waveguide 1600 maintains a match in pressure amplitude according to the mode function, for example, as shown. As the distance from the open end of the waveguide 1600 increases, the curvature at each step along the length of the waveguide can be determined to ensure that the acoustic path on each side of the wall 1607 of the waveguide is such that the pressure amplitudes match front to back across the wall according to the modal distribution function shown in FIG. 25. The process can continue along the full length of the wall 1607 until the distance reaches the position of the peak (Mode 1), for example, about x/L=0.3 shown in FIG. 25. In particular, the overall shape of the waveguide 1600 can be calculated by varying the curvature accordingly until the full length of the wall 1607 has been calculated, and the rest of the waveguide length toward the closed end is added.

This position represents the center of the turned corner, similar to how the x/L=0.33 corresponds to the bend in the geometry illustrated in FIG. 22. By determining the wall curvature in this manner, the rest of the waveguide from the x/L=0.3 location to the closed end can be added without impacting the features described herein with respect to the waveguide 1600. Accordingly, the waveguide 1600 can be folded beyond the x/L=0.3 location to reduce the waveguide footprint, for example, as shown in FIG. 26.

It is to be understood that the foregoing description is intended to illustrate and not to limit the scope of the invention, which is defined by the scope of the appended claims. Other embodiments are within the scope of the following claims.

What is claimed is:

1. An acoustic waveguide system, comprising:

an enclosure having a closed end and an open end;

an acoustic transmission line within the enclosure; and at least one electro-acoustic transducer disposed along a length of the acoustic transmission line to emit acoustic energy directly into the acoustic transmission line, and constructed and arranged at a location along the length of the acoustic transmission line where at least one resonant mode above a fundamental resonant mode has a highest pressure amplitude, and where acoustic energy output from each of a front side and a rear side of the at least one electro-acoustic transducer has a pressure amplitude that is symmetric about the highest pressure amplitude to prohibit exciting the at least one resonant mode above the fundamental resonant mode of the acoustic waveguide system.

2. The acoustic waveguide system of claim 1, wherein the acoustic energy output from the front side and the rear side is out of phase, such that the at least one electro-acoustic transducer prohibits exciting the at least one resonant mode.

3. The acoustic waveguide system of claim 1, wherein the acoustic transmission line is a folded acoustic transmission line, the enclosure comprises an internal wall with each side of the internal wall forming at least some of a boundary of the folded acoustic transmission line, and the at least one electro-acoustic transducer is disposed along the internal wall.

4. The acoustic waveguide system of claim 3, wherein the at least one electro-acoustic transducer prohibits exciting only the first resonant mode above the fundamental resonant mode of the acoustic waveguide system.

5. The acoustic waveguide system of claim 3, wherein the at least one electro-acoustic transducer is coupled to the internal wall such that a front side and a rear side of the electro-acoustic transducer are symmetric about a point along the length of the acoustic transmission line.

6. The acoustic waveguide system of claim 5, wherein the point or the location along the length of the acoustic transmission line is at approximately one third of the length of the acoustic transmission line, measured from the open end of the enclosure, and wherein the approximately one third of the length of the acoustic transmission line is where the resonant mode above the fundamental resonant mode has the highest pressure amplitude, and where the acoustic energy output from each of the front side and the rear side of the at least one electro-acoustic transducer has the pressure amplitude that is symmetric about the highest pressure amplitude to prohibit exciting at least one resonant mode above a fundamental resonant mode of the acoustic waveguide system.

7. The acoustic waveguide system of claim 1, wherein the at least one electro-acoustic transducer prohibits exciting only the second resonant mode above the fundamental resonant mode of the acoustic waveguide system.

8. The acoustic waveguide system of claim 7, wherein the at least one electro-acoustic transducer is coupled to an internal wall of the enclosure such that a front side and a rear side of the electro-acoustic transducer are symmetric about a point on the acoustic transmission line, and wherein the point is at approximately one fifth of the length of the acoustic transmission line, measured from the open end of the enclosure.

9. The acoustic waveguide system of claim 1, wherein the at least one electro-acoustic transducer comprises a plurality of electro-acoustic transducers, and wherein none of the electro-acoustic transducers excite the at least one resonant mode above the fundamental resonant mode.

10. The acoustic waveguide system of claim 1, wherein the acoustic transmission line comprises at least two folds, and wherein the at least one electro-acoustic transducer is arranged at a fold of the at least two folds nearest the open end of the acoustic transmission line.

11. The acoustic waveguide system of claim 1, wherein the acoustic waveguide system comprises a tapered acoustic transmission line that tapers from the closed end to the open end, and further comprises internal and external walls having a curved geometry.

12. The acoustic waveguide system of claim 11, wherein the internal wall comprises a fold of the waveguide system such that the internal wall includes locations along the internal wall such that distances on one side of the internal wall versus the other side of the internal wall maintains a match in pressure amplitude according to a mode function.

13. An acoustic waveguide system, comprising:

an enclosure having a closed end, an open end, and an internal wall;

an acoustic transmission line within the enclosure; and at least one electro-acoustic transducer disposed along a length of the acoustic transmission line to emit acoustic energy directly into the acoustic transmission line, wherein the at least one electro-acoustic transducer is coupled to the internal wall such that acoustic energy output from each of a front side and a rear side of the electro-acoustic transducer has a pressure amplitude that is symmetric about a highest pressure amplitude of at least one resonant mode above a fundamental resonant mode at a point along the length of the acoustic transmission line where the at least one electro-acoustic transducer prohibits exciting the at least one resonant mode above the fundamental resonant mode of the acoustic waveguide system.

14. The acoustic waveguide system of claim 13, wherein the acoustic transmission line is a folded acoustic transmission line.

15. The acoustic waveguide system of claim 14, wherein the point along the length of the acoustic transmission line is at approximately one third of the length of the acoustic transmission line, measured from the open end of the enclosure.

16. The acoustic waveguide system of claim 13, wherein the at least one electro-acoustic transducer prohibits exciting only a first or second resonant mode above the fundamental resonant mode of the acoustic waveguide system.

17. The acoustic waveguide system of claim 16, wherein the at least one electro-acoustic transducer is coupled to an internal wall of the enclosure such that the front side and the rear side of the electro-acoustic transducer are symmetric about a point along the length of the acoustic transmission line, and wherein the point is at approximately one fifth of the length of the acoustic transmission line, measured from the open end of the enclosure, and wherein the approximately one fifth of the length of the acoustic transmission line is where the resonant mode above the fundamental resonant mode has the highest pressure amplitude, and where the acoustic energy output from each of the front side and the rear side of the at least one electro-acoustic transducer has the pressure amplitude that is symmetric about the highest pressure amplitude.

18. The acoustic waveguide system of claim 13, wherein the acoustic transmission line comprises at least two folds, and wherein the at least one electro-acoustic transducer is arranged at a fold of the at least two folds nearest the open end of the acoustic transmission line.

19. The acoustic waveguide system of claim 13, wherein the acoustic waveguide system comprises a tapered acoustic transmission line that tapers from the closed end to the open end, and further comprises internal and external walls having a curved geometry.

20. The acoustic waveguide system of claim 19, wherein the curved geometry comprises locations along which a distance on one side of the waveguide system versus the other side of the waveguide system maintains a match in pressure amplitude according to a mode function.

* * * * *